United States Patent
Orgeron et al.

(10) Patent No.: US 9,500,049 B1
(45) Date of Patent: *Nov. 22, 2016

(54) GRIP AND VERTICAL STAB APPARATUS AND METHOD

(71) Applicant: T&T Engineering Services, Inc., Tomball, TX (US)

(72) Inventors: Keith J. Orgeron, Spring, TX (US); Gary Firth, Hockley, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/855,599

(22) Filed: Apr. 2, 2013

Related U.S. Application Data

(63) Continuation-in-part of application No. 12/632,261, filed on Dec. 7, 2009, now Pat. No. 8,408,334.

(60) Provisional application No. 61/121,838, filed on Dec. 11, 2008.

(51) Int. Cl.
*E21B 19/15* (2006.01)
*G21F 7/00* (2006.01)
(Continued)

(52) U.S. Cl.
CPC .......... *E21B 19/155* (2013.01); *B25J 5/02* (2013.01); *B25J 21/00* (2013.01); *G21F 7/00* (2013.01)

(58) Field of Classification Search
USPC ............ 166/77.53, 85.5; 269/43, 59, 60; 294/81.2, 81.6, 81.61, 81.62; 414/22.51–22.59, 22.61–22.69, 23, 414/347, 589, 623, 624, 664, 680, 731, 732, 414/735, 736, 744.3, 744.7, 745.1, 745.2, 414/745.4, 745.5, 745.6, 751.1; 74/89.25, 74/89.32, 89.33; 81/57.16, 57.24, 57.35; 901/16, 31

See application file for complete search history.

(56) References Cited

U.S. PATENT DOCUMENTS

| | | | |
|---|---|---|---|
| 62,404 A | 2/1867 | Gile et al. | |
| 184,168 A | 11/1876 | Nickle | |
| 364,077 A | 5/1887 | Addis | |

(Continued)

FOREIGN PATENT DOCUMENTS

| | | |
|---|---|---|
| EP | 0024433 A1 | 3/1981 |
| GB | 727780 A | 4/1955 |

(Continued)

OTHER PUBLICATIONS

Chronis, Nicholas P.; Mechanisms & Mechanical Devices Sourcebook, 1991, ch. 10, pp. 399-414, ISBN 0-07-010918-4, McGraw-Hill, Inc.

*Primary Examiner* — Gregory Adams

(74) *Attorney, Agent, or Firm* — John G. Fischer, Esq.; Scheef & Stone, L.L.P.

(57) ABSTRACT

A tubular handling apparatus has a main rotating structural member pivotally movable between a first position and a second position, an arm interconnected to the main rotating structural member, and a gripper mechanism affixed to an end of the arm opposite the main rotating structural member. The gripper mechanism has a stab frame, a first gripper translatably attached to a side of the stab frame, and a second gripper translatably attached to the side of the stab frame below the first gripper. A connection bar is connected to the first and second grippers so as to translate the grippers for a substantially identical distance. A translating mechanism translates the grippers along the side of the stab frame.

7 Claims, 10 Drawing Sheets

(51) Int. Cl.
   *B25J 21/00*      (2006.01)
   *B25J 5/02*       (2006.01)

(56) References Cited

U.S. PATENT DOCUMENTS

| | | | |
|---|---|---|---|
| 514,715 A | 2/1894 | Jenkins | |
| 1,175,792 A | 3/1916 | Mickelsen | |
| 1,264,867 A | 4/1918 | Schuh | |
| 1,312,009 A | 8/1919 | Thrift | |
| 1,318,789 A | 10/1919 | Moschel | |
| 1,396,317 A | 11/1921 | Boyter | |
| 1,417,490 A | 5/1922 | Brandon | |
| 1,972,635 A | 9/1934 | Whinnen | |
| 1,981,304 A | 11/1934 | Brandt | |
| 2,124,154 A | 7/1937 | Sovincz | |
| 2,327,461 A | 8/1943 | Rowe | |
| 2,369,534 A | 2/1945 | Cohen | |
| 2,382,767 A | 8/1945 | Zeilman | |
| 2,476,210 A | 7/1949 | Moore | |
| 2,497,083 A | 2/1950 | Hildebrand | |
| 2,509,853 A | 5/1950 | Wilson | |
| 2,535,054 A | 12/1950 | Ernst et al. | |
| 2,592,168 A | 4/1952 | Morris et al. | |
| 2,595,307 A | 5/1952 | Selberg | |
| 2,715,014 A | 8/1955 | Garnett et al. | |
| 2,770,493 A | 11/1956 | Fieber | |
| 2,771,204 A * | 11/1956 | McCormick | 414/623 |
| 2,814,396 A | 11/1957 | Neal, Sr. | |
| 2,828,024 A | 3/1958 | True | |
| 2,840,244 A | 6/1958 | Thomas, Jr. | |
| 3,016,922 A | 1/1962 | Wilson | |
| 3,033,529 A | 5/1962 | Pierrat | |
| 3,059,905 A | 10/1962 | Tompkins | |
| 3,076,560 A | 2/1963 | Bushong et al. | |
| 3,136,394 A | 6/1964 | Woolslayer et al. | |
| 3,177,944 A | 4/1965 | Knights | |
| 3,180,496 A | 4/1965 | Smith | |
| 3,194,313 A | 7/1965 | Fanshawe | |
| 3,262,593 A | 7/1966 | Hainer | |
| 3,280,920 A * | 10/1966 | Scott | 173/44 |
| 3,331,585 A | 7/1967 | Dubberke | |
| 3,365,762 A | 1/1968 | Spiri | |
| 3,464,507 A | 9/1969 | Alexander et al. | |
| 3,477,522 A | 11/1969 | Templeton | |
| 3,559,821 A | 2/1971 | James | |
| 3,561,811 A | 2/1971 | Turner, Jr. | |
| 3,633,771 A * | 1/1972 | Woolslayer et al. | 414/22.55 |
| 3,682,259 A | 8/1972 | Cintract et al. | |
| 3,702,640 A | 11/1972 | Cintract et al. | |
| 3,703,968 A | 11/1972 | Uhrich et al. | |
| 3,774,781 A | 11/1973 | Merkley | |
| 3,804,264 A | 4/1974 | Hedeen et al. | |
| 3,805,463 A | 4/1974 | Lang et al. | |
| 3,806,021 A | 4/1974 | Moroz et al. | |
| 3,823,916 A | 7/1974 | Shaw | |
| 3,848,850 A | 11/1974 | Bemis | |
| 3,860,122 A | 1/1975 | Cernosek | |
| 3,883,009 A | 5/1975 | Swoboda, Jr. et al. | |
| 3,942,593 A | 3/1976 | Reeve, Jr. et al. | |
| 3,963,133 A | 6/1976 | Gilli | |
| 3,986,619 A | 10/1976 | Woolslayer et al. | |
| 3,991,887 A | 11/1976 | Trout | |
| 3,995,746 A | 12/1976 | Usagida | |
| 4,011,694 A | 3/1977 | Langford | |
| 4,030,698 A | 6/1977 | Hansen | |
| 4,044,952 A | 8/1977 | Williams et al. | |
| 4,067,369 A * | 1/1978 | Harmon | 144/34.1 |
| 4,135,340 A | 1/1979 | Cox et al. | |
| 4,138,805 A | 2/1979 | Patterson | |
| 4,142,551 A | 3/1979 | Wilms | |
| 4,158,283 A | 6/1979 | Nation | |
| 4,172,684 A | 10/1979 | Jenkins | |
| 4,221,269 A | 9/1980 | Hudson | |
| 4,269,554 A | 5/1981 | Jackson | |
| 4,276,918 A | 7/1981 | Sigouin | |
| 4,290,495 A | 9/1981 | Elliston | |
| 4,303,270 A | 12/1981 | Adair | |
| 4,336,840 A | 6/1982 | Bailey | |
| 4,386,883 A | 6/1983 | Hogan et al. | |
| 4,403,666 A | 9/1983 | Willis | |
| 4,403,897 A | 9/1983 | Willis | |
| 4,403,898 A | 9/1983 | Thompson | |
| 4,407,629 A | 10/1983 | Willis | |
| 4,420,917 A | 12/1983 | Parlanti | |
| 4,426,182 A | 1/1984 | Frias et al. | |
| 4,440,536 A | 4/1984 | Scaggs | |
| 4,492,501 A | 1/1985 | Haney | |
| 4,529,094 A | 7/1985 | Wadsworth | |
| 4,547,110 A | 10/1985 | Davidson et al. | |
| 4,586,572 A * | 5/1986 | Myers et al. | 175/85 |
| 4,595,066 A | 6/1986 | Nelmark et al. | |
| 4,598,509 A | 7/1986 | Woolslayer et al. | |
| 4,650,235 A * | 3/1987 | Shaginian et al. | 294/201 |
| 4,650,237 A | 3/1987 | Lessway | |
| 4,688,983 A | 8/1987 | Lindbom | |
| 4,702,663 A * | 10/1987 | Mischke et al. | 414/618 |
| 4,708,581 A | 11/1987 | Adair | |
| 4,759,414 A | 7/1988 | Willis | |
| 4,765,401 A | 8/1988 | Boyadjieff | |
| 4,767,100 A | 8/1988 | Philpot | |
| 4,822,230 A | 4/1989 | Slettedal | |
| 4,834,604 A * | 5/1989 | Brittain et al. | 414/22.55 |
| 4,869,137 A | 9/1989 | Slator | |
| 4,982,853 A | 1/1991 | Kishi | |
| 5,060,762 A | 10/1991 | White | |
| 5,099,707 A * | 3/1992 | Tori et al. | 74/490.03 |
| 5,135,119 A | 8/1992 | Larkin | |
| 5,150,642 A | 9/1992 | Moody et al. | |
| 5,186,264 A | 2/1993 | du Chaffaut | |
| 5,255,751 A * | 10/1993 | Stogner | 175/203 |
| 5,415,057 A | 5/1995 | Nihei et al. | |
| 5,458,454 A | 10/1995 | Sorokan | |
| 5,518,575 A * | 5/1996 | Watanabe | 156/494 |
| 5,597,987 A | 1/1997 | Gilliland et al. | |
| 5,609,226 A | 3/1997 | Penisson | |
| 5,609,260 A | 3/1997 | Liao | |
| 5,609,457 A | 3/1997 | Burns | |
| 5,649,745 A | 7/1997 | Anderson | |
| 5,660,087 A | 8/1997 | Rae | |
| 5,671,932 A | 9/1997 | Chapman | |
| 5,702,139 A | 12/1997 | Buck | |
| 5,711,382 A * | 1/1998 | Hansen et al. | 175/52 |
| 5,806,589 A | 9/1998 | Lang | |
| 5,848,647 A | 12/1998 | Webre et al. | |
| 5,931,238 A | 8/1999 | Gilmore et al. | |
| 5,964,550 A | 10/1999 | Blandford et al. | |
| 5,988,299 A | 11/1999 | Hansen et al. | |
| 5,992,801 A | 11/1999 | Torres | |
| 5,993,140 A | 11/1999 | Crippa | |
| 6,003,598 A | 12/1999 | Andreychuk | |
| 6,047,771 A * | 4/2000 | R.o slashed.ynestad | 166/77.52 |
| 6,079,490 A | 6/2000 | Newman | |
| 6,079,925 A | 6/2000 | Morgan et al. | |
| 6,158,516 A | 12/2000 | Smith et al. | |
| 6,220,807 B1 | 4/2001 | Sorokan | |
| 6,227,587 B1 | 5/2001 | Terral | |
| 6,234,253 B1 | 5/2001 | Dallas | |
| 6,237,445 B1 | 5/2001 | Wesch, Jr. | |
| 6,253,845 B1 | 7/2001 | Belik | |
| 6,263,763 B1 | 7/2001 | Feigel, Jr. et al. | |
| 6,264,128 B1 | 7/2001 | Shampine et al. | |
| 6,264,395 B1 | 7/2001 | Allamon et al. | |
| 6,279,662 B1 | 8/2001 | Sonnier | |
| 6,298,928 B1 | 10/2001 | Penchansky | |
| 6,311,788 B1 | 11/2001 | Weixler | |
| 6,343,892 B1 | 2/2002 | Kristiansen | |
| 6,398,186 B1 | 6/2002 | Lemoine | |
| 6,431,286 B1 | 8/2002 | Andreychuk | |
| 6,471,439 B2 | 10/2002 | Allamon et al. | |
| 6,485,285 B1 * | 11/2002 | Shiotani | 425/139 |
| 6,502,641 B1 | 1/2003 | Carriere et al. | |
| 6,533,045 B1 | 3/2003 | Cooper | |
| 6,543,551 B1 | 4/2003 | Sparks et al. | |
| 6,543,555 B2 | 4/2003 | Casagrande | |

(56) References Cited

U.S. PATENT DOCUMENTS

| | | |
|---|---|---|
| 6,550,128 B1 | 4/2003 | Lorenz |
| 6,557,641 B2 | 5/2003 | Sipos et al. |
| 6,581,698 B1 | 6/2003 | Dirks |
| 6,609,573 B1 | 8/2003 | Day |
| 6,705,414 B2 | 3/2004 | Simpson et al. |
| 2,745,646 A1 | 6/2004 | Pietras et al. |
| 6,748,823 B2 | 6/2004 | Pietras |
| 6,763,898 B1 | 7/2004 | Roodenburg et al. |
| 6,779,614 B2 | 8/2004 | Oser |
| 6,814,149 B2 | 11/2004 | Liess et al. |
| 6,845,814 B2 | 1/2005 | Mason et al. |
| 6,854,520 B1 | 2/2005 | Robichaux |
| 7,017,450 B2 | 3/2006 | Bangert |
| 7,028,585 B2 | 4/2006 | Pietras et al. |
| 7,036,202 B2 | 5/2006 | Lorenz |
| 7,036,396 B2 * | 5/2006 | Moe et al. ............ 81/57.2 |
| 7,044,315 B2 | 5/2006 | Willim |
| 7,055,594 B1 | 6/2006 | Springett et al. |
| 7,077,209 B2 | 7/2006 | McCulloch et al. |
| 7,090,035 B2 | 8/2006 | Lesko |
| 7,090,254 B1 | 8/2006 | Pietras et al. |
| 7,117,938 B2 | 10/2006 | Hamilton et al. |
| 7,121,166 B2 | 10/2006 | Drzewiecki |
| 7,172,038 B2 | 2/2007 | Terry et al. |
| 7,249,639 B2 | 7/2007 | Belik |
| 7,289,871 B2 | 10/2007 | Williams |
| 7,296,623 B2 | 11/2007 | Koithan et al. |
| 7,398,833 B2 | 7/2008 | Ramey et al. |
| 7,413,398 B2 * | 8/2008 | Bangert et al. ............ 414/745.2 |
| 7,438,127 B2 | 10/2008 | Lesko |
| 7,503,394 B2 | 3/2009 | Bouligny |
| 7,726,929 B1 | 6/2010 | Orgeron |
| 7,918,636 B1 | 4/2011 | Orgeron |
| 7,946,795 B2 | 5/2011 | Orgeron |
| 7,980,802 B2 | 7/2011 | Orgeron |
| 8,011,426 B1 | 9/2011 | Orgeron |
| 8,128,332 B2 | 3/2012 | Orgeron |
| 8,172,497 B2 | 5/2012 | Orgeron et al. |
| 8,192,128 B2 | 6/2012 | Orgeron |
| 8,192,129 B1 | 6/2012 | Orgeron |
| 8,235,104 B1 | 8/2012 | Sigmar et al. |
| 8,371,790 B2 | 2/2013 | Sigmar et al. |
| 8,393,844 B2 | 3/2013 | Orgeron |
| 8,408,334 B1 * | 4/2013 | Orgeron .................. 175/85 |
| 8,419,335 B1 | 4/2013 | Orgeron |
| 8,469,085 B2 | 6/2013 | Orgeron |
| 8,469,648 B2 | 6/2013 | Orgeron |
| 8,474,806 B2 | 7/2013 | Orgeron |
| 8,496,238 B1 | 7/2013 | Orgeron |
| 8,506,229 B2 | 8/2013 | Orgeron |
| 8,550,174 B1 | 10/2013 | Orgeron et al. |
| 8,646,522 B1 | 2/2014 | Orgeron |
| 8,690,508 B1 | 4/2014 | Orgeron |
| 2002/0070187 A1 | 6/2002 | Willim |
| 2003/0221871 A1 | 12/2003 | Hamilton et al. |
| 2004/0040926 A1 | 3/2004 | Irsch et al. |
| 2005/0160880 A1 * | 7/2005 | Schulze-Beckinghausen et al. ............ 81/57.34 |
| 2005/0269133 A1 * | 12/2005 | Little ............ 175/52 |
| 2006/0016775 A1 | 1/2006 | Willim |
| 2006/0151215 A1 | 7/2006 | Skogerbo |
| 2007/0074460 A1 | 4/2007 | Belik |
| 2007/0286707 A1 * | 12/2007 | Eddowes et al. ........... 414/22.51 |
| 2008/0078965 A1 | 4/2008 | Lane et al. |
| 2008/0174131 A1 | 7/2008 | Bouligny et al. |
| 2008/0202812 A1 | 8/2008 | Childers et al. |
| 2008/0253866 A1 * | 10/2008 | Lops et al. ............ 414/22.55 |

FOREIGN PATENT DOCUMENTS

| | | | |
|---|---|---|---|
| GB | 2264736 A | 9/1993 | |
| JP | 20011287127 A1 | 10/2001 | |
| WO | 93/15303 A1 | 8/1993 | |
| WO | 2006/038790 A1 | 4/2006 | |
| WO | WO 2006038790 A1 * | 4/2006 | ............ E21B 19/15 |

\* cited by examiner

GRIP AND VERTICAL STAB APPARATUS AND METHOD

CROSS-REFERENCE TO RELATED U.S. APPLICATIONS

The present application is a continuation-in-part of U.S. patent application Ser. No. 12/632,261 filed Dec. 7, 2009, now U.S. Pat. No. 8,408,334, which claims the benefit of U.S. Provisional Patent Application No. 61/121,838 filed Dec. 11, 2008.

BACKGROUND OF THE INVENTION

1. Field of the Invention

The present invention relates to tubular handling apparatus. Particularly, the present invention relates to tubular handling apparatus having a main rotating structural member pivoting between a first and a second position. Additionally, the present invention relates to tubular handling apparatus having grippers attached to a stab frame. More particularly, the present invention relates to grippers that translate along the side of the stab frame as the main rotating structural member moves between the first and second positions.

2. Description of Related Art Including Information Disclosed Under 37 CFR 1.97 and 37 CFR 1.98

Drill rigs utilize several methods for transferring tubular members from a pipe rack adjacent to the drill floor to a mousehole in the drill floor or the wellbore for connection to a previously transferred tubular or tubular string. The term "tubular" as used herein is interchangeable with all forms of pipe, drill pipe, drill collars, casing, liner, bottom hole assemblies (BHA), and other types of tubulars known in the art.

Conventionally, drill rigs utilize a combination of the rig cranes and the traveling system for transferring a tubular from the pipe rack to a vertical position above the center of the well. The obvious disadvantage with the prior art systems is that there is a significant manual involvement in attaching the pipe elevators to the tubular and moving the pipe from the drill rack to the rotary table at the well head. This manual transfer operation in the vicinity of workers is potentially dangerous and has caused numerous injuries in drilling operations. Further, the hoisting system may allow the tubular to come into contact with the catwalk or other portions of the rig as the tubular is transferred from the pipe rack to the drill floor. This can damage the tubular and may affect the integrity of the connections between successive tubulars in the well.

One method of transferring pipe from the rack to the well platform comprises tying one end of a line on the rig around a selected pipe on the pipe rack. The pipe is thereafter lifted up onto the platform and the lower end thereof is placed into the mousehole. The mousehole is simply an upright, elongate cylindrical container adjacent to the rotary table which supports the pipe temporarily. When it is necessary to add the pipe to the drill string, slips are secured about the drill string on the rotary table thereby supporting the same in the wellbore. The pipe is disconnected from the traveling equipment, and the elevators, or the kelly, are connected to the pipe in the mousehole. Next, the traveling block is raised by positioning the pipe over the drill string. Tongs are used to secure the pipe to the upper end of the drill string. The drill pipe elevators suspend the drill pipe from a collar, which is formed around one end of the pipe and does not clamp the pipe, thereby permitting rotational pipe movement in order to threadably engage the same to the drill string.

A prior art technique for moving joints of casing from racks adjacent to the drilling rig involves tying a line from the rig onto one end of a selected casing joint on the rack. The line is raised by lifting the casing joint up a ramp leading to the rig platform. As the rope lifts the casing from the rack, the lower end of the casing swings across the platform in a dangerous manner. The danger increases when a floating system is used in connection with drilling. Because the rope is tied around the casing at one end thereof, the casing does not hang vertically, but rather tilts somewhat. A man working on a platform elevated above the rig floor must hold the top of the casing and straighten it out while the casing is threaded into the casing string which is suspended in the wellbore by slips positioned on the rotary table.

It is desirable to be able to grip casing or pipe positioned on a rack adjacent a drilling well, move the same into vertical orientation over the wellbore, and thereafter lower the same onto the string suspended in the wellbore.

In the past, various devices have been created which mechanically move a pipe from a horizontal orientation to a vertical orientation such that the vertically-oriented pipe can be installed into the wellbore. Typically, these devices have utilized several interconnected arms that are associated with a boom. In order to move the pipe, a succession of individual movements of the levers, arms, and other components of the boom must be performed in a coordinated manner in order to achieve the desired result. Typically, a wide variety of hydraulic actuators are connected to each of the components so as to carry out the prescribed movement. A complex control mechanism is connected to each of these actuators so as to achieve the desired movement. Advanced programming is required of the controller in order to properly coordinate the movements in order to achieve this desired result.

Unfortunately, with such systems, the hydraulic actuators, along with other components, can become worn with time. Furthermore, the hydraulic integrity of each of the actuators can become compromised over time. As such, small variations in each of the actuators can occur. These variations, as they occur, can make the complex mechanism rather inaccurate. The failure of one hydraulic component can exacerbate the problems associated with the alignment of the pipe in a vertical orientation. Adjustments of the programming are often necessary so as to continue to achieve the desired results. Fundamentally, the more hydraulic actuators that are incorporated into such a system, the more likely it is to have errors, inaccuracies, and deviations in the desired delivery profile of the tubular. Typically, very experienced and knowledgeable operators are required so as to carry out this pipe movement operation. This adds significantly to the cost associated with pipe delivery.

In the past, pipe handling apparatus have not been used for the installation of casing. The problem associated with casing is that the threads of the casing are formed on an inner wall and on an outer wall at the ends of each of the casing sections. Whenever these threads are formed, the relatively thin wall thickness of the casing is further minimized. Additionally, great precision is required so as to properly thread the threads of one casing section within the threads of an adjacent casing section. The amount of accuracy required for the delivery of the casing by a pipe handling apparatus, in the past, has not been sufficient so as to achieve the desired degree of accuracy for the installation of the casing sections in their threaded connection. The improper installation of one casing section upon another casing section can potentially damage the threads associated with such casing sections. Additionally, in the past, the pipe handling apparatus could potentially damage the thin-walled casing sections during the delivery. As such, a need has developed to adapt a pipe handling apparatus so as to achieve the desired amount of accuracy for the installation of casing sections.

Various patents have issued relating to tubular handling apparatus. For example, U.S. application Ser. No. 11/923,451, filed on Oct. 24, 2007, discloses a pipe handling apparatus that has a boom pivotally movable between a first position and a second position, a riser assembly pivotally connected to the boom, an arm pivotally connected at one end to the first portion of the riser assembly and extending outwardly therefrom, a gripper affixed to an opposite end of the arm suitable for gripping a diameter of the pipe, a link pivotally connected to the riser assembly and pivotable so as to move relative to the movement of the boom between the first and second positions, and a brace having one end pivotally connected to the boom and an opposite end pivotally connected to the arm between the ends of the arm. The riser assembly has a first portion extending outwardly at an obtuse angle with respect to the second portion. The gripper has a stab frame affixed to an end of the arm, and grippers affixed to the side of the stab frame opposite the arm.

U.S. Pat. No. 3,177,944, issued on Apr. 13, 1965, to R. N. Knights discloses a racking mechanism for earth boring equipment that provides for horizontal storage of pipe lengths on one side of and clear of the derrick. This is achieved by means of a transport arm which is pivoted toward the base of the derrick for swing movement in a vertical plane. The outer end of the arm works between a substantially vertical position in which it can accept a pipe length from, or deliver a pipe length to, a station in the derrick, and a substantially horizontal portion in which the arm can deliver a pipe length to, or accept a pipe length from, a station associated with storage means on one side of the derrick.

U.S. Pat. No. 3,464,507, issued on Sep. 2, 1969, to E. L. Alexander et al. discloses a portable rotary pipe handling system. This system includes a mast pivotally mounted and movable between a reclining transport position to a desired position at the site drilling operations which may be at any angle up to vertical. The mast has guides for a traveling mechanism that includes a block movable up and down the mast through operation of cables reeved from the traveling block over crown block pulleys into a drawwork. A power drill drive is carried by the traveling block. An elevator for drill pipe is carried by an arm swingably mounted relative to the power unit. Power tongs, slips, and slip bushings are supported adjacent the lower end of the mast and adapted to have a drill pipe extend therethrough from a drive bushing connected to a power drive whereby the drill pipe is extended in the direction of the hole to be drilled.

U.S. Pat. No. 3,633,771, issued on Jan. 11, 1972, to Woolslayer et al. discloses an apparatus for moving drill pipe into and out of an oil well derrick. A stand of pipe is gripped by a strongback which is pivotally mounted to one end of a boom. The boom swings the strongback over the rotary table, thereby vertically aligning the pipe stand with the drill string. When both adding pipe to and removing pipe from the drill string, all vertical movement of the pipe is accomplished by the elevator suspended from the traveling block.

U.S. Pat. No. 3,860,122, issued on Jan. 14, 1975, to L. C. Cemosek discloses an apparatus for transferring a tubular member, such as a pipe, from a storage area to an oil well drilling platform. The positioning apparatus includes a pipe positioner mounted on a platform for moving the pipe to a release position whereby the pipe can be released to be lowered to a submerged position. A load means is operably attached or associated with the platform and positioning means in order to move the pipe in a stored position to a transfer position in which the pipe is transferred to the positioner. The positioner includes a tower having pivotally mounted thereon a pipe track with a plurality of pipe clamp assemblies which are adapted to receive a pipe length. The pipe track is pivotally movable by hydraulic power means or gear means between a transfer position in which pipe is moved into the plurality of clamp assemblies and the release position in which the pipe is released for movement to a submerged position.

U.S. Pat. No. 3,986,619, issued on Oct. 19, 1976, to Woolslayer et al. discloses a pipe handling apparatus for an oil well drilling derrick. In this apparatus, the inner end of the boom is pivotally supported on a horizontal axis in front of a well. A clamping means is pivotally connected to the outer end of the boom on an axis parallel to the horizontal axis at one end. The clamping means allows the free end of the drill pipe to swing across the boom as the outer end of the boom is raised or lowered. A line is connected at one end with the traveling block that raises and lowers the elevators and at the other end to the boom so as to pass around sheaves.

U.S. Pat. No. 4,172,684, issued on Oct. 30, 1979, to C. Jenkins discloses a floor level pipe handling apparatus which is mounted on the floor of an oil well derrick suitable structure. This apparatus includes a support that is rockable on an axis perpendicular to the centerline of a well being drilled. One end of an arm is pivotally mounted on the support on an axis transverse to the centerline of the well. The opposite end of the arm carries a pair of shoes having laterally opening pipe-receiving seats facing away from the arm. The free end of the arm can be swung toward and away from the well centerline and the arm support can be rocked to swing the arm laterally.

U.S. Pat. No. 4,403,666, issued on Sep. 13, 1983, to C. A. Willis discloses self-centering tongs and a transfer arm for a drilling apparatus. The clamps of the transfer arm are resiliently mounted to the transfer arm so as to provide limited axial movement of the clamps and thereby of a clamped downhole tubular. A pair of automatic, self-centering, hydraulic tongs is provided for making up and breaking out threaded connections of tubulars.

U.S. Pat. No. 4,407,629, issued on Oct. 4, 1983, to C. A. Willis discloses a lifting apparatus for downhole tubulars. This lifting apparatus includes two rotatably mounted clamps which are rotatable between a side loading-position so as to facilitate the loading and unloading in the horizontal position, and a central position, in which a clamped tubular is aligned with the drilling axis when the boom is in the vertical position. An automatic hydraulic sequencing circuit is provided to automatically rotate the clamps into the side-loading position whenever the boom is pivoted with a downhole tubular positioned in the clamp. In this position, the clamped tubular is aligned with a safety plate mounted on the boom to prevent a clamped tubular from slipping from the clamps.

U.S. Pat. No. 4,492,501, issued on Jan. 8, 1985, to K. M. Haney discloses a platform positioning system for a drilling operation which includes a support structure and a transfer arm pivotally connected to the support structure to rotate about a first axis. This platform positioning system includes a platform which is pivotally connected to the support structure to rotate about a second axis, and rod which is mounted between the transfer arm and the platform. The position of the arm and platform axes and the length of the rod are selected such that the transfer arm automatically and progressively raises the platform to the raised position by means of the rod as the transfer arm moves to the raised position. The transfer arm automatically and progressively lowers the platform to the lowered position by means of the rod as the transfer arm moves to the lowered position.

U.S. Pat. No. 4,595,066, issued on Jun. 17, 1986, to Nelmark et al. discloses an apparatus for handling drill pipes and used in association with blast holes. This system allows a drill pipe to be more easily connected and disconnected to a drill string in a hole being drilled at an angle. A receptacle is formed at the lower end of the carrier that has hydraulically operated doors secured by a hydraulically operated lock. A gate near the upper end is pneumatically operated in response to the hydraulic operation of the receptacle lock.

U.S. Pat. No. 4,822,230, issued on Apr. 18, 1989, to P. Slettedal discloses a pipe handling apparatus which is adapted for automated drilling operations. Drill pipes are manipulated between substantially horizontal and vertical positions. The apparatus is used with a top mounted drilling device which is rotatable about a substantially horizontal axis. The apparatus utilizes a strongback provided with clamps to hold and manipulate pipes. The strongback is rotatably connected to the same axis as the drilling device. The strongback moves up or down with the drilling device. A brace unit is attached to the strongback to be rotatable about a second axis.

U.S. Pat. No. 4,834,604, issued on May 30, 1989, to Brittain et al. discloses a pipe moving apparatus and method for moving casing or pipe from a horizontal position adjacent a well to a vertical position over the wellbore. The machine includes a boom movable between a lowered position and a raised position by a hydraulic ram. A strongback grips the pipe and holds the same until the pipe is vertically positioned. Thereafter, a hydraulic ram on the strongback is actuated, thereby lowering the pipe or casing onto the string suspended in the wellbore and the additional pipe or casing joint is threaded thereto.

U.S. Pat. No. 4,708,581, issued on Nov. 24, 1987, H. L. Adair discloses a method for positioning a transfer arm for the movement of drill pipe. A drilling mast and a transfer arm are mounted at a first axis adjacent the mast to move between a lowered position near ground level and an upper position aligned with the mast. A reaction point anchor is fixed with respect to the drilling mast and spaced from the first axis. A fixed length link is pivotally mounted to the transfer arm at a second axis, spaced from the first axis, and a first single stage cylinder is pivotally mounted at one end to the distal end of the link and at the other end to the transfer arm. A second single stage hydraulic cylinder is pivotally mounted at one end to the distal end of the link and at the other end to the reaction point.

U.S. Pat. No. 4,759,414, issued on Jul. 26, 1988, to C. A. Willis discloses a drilling machine which includes a drilling superstructure skid which defines two spaced-apart parallel skid runners and a platform. The platform supports a drawworks mounted on a drawworks skid, and a pipe boom is mounted on a pipe boom skid sized to fit between the skid runners of the drilling substructure skid. The drilling substructure skid supports four legs which, in turn, support a drilling platform on which is mounted a lower mast section. The pipe boom skid mounts a pipe boom as well as a boom linkage, a motor, and a hydraulic pump adapted to power the pipe boom linkage. Mechanical position locks hold the upper skid in relative position over the lower skid.

U.S. Pat. No. 5,458,454, issued on Oct. 17, 1995, to R. S. Sorokan discloses a pipe handling method which is used to move tubulars used from a horizontal position on a pipe rack adjacent the wellbore to a vertical position over the wall center. This method utilizes bicep and forearm assemblies and a gripper head for attachment to the tubular. The path of the tubular being moved is close to the conventional path of the tubular utilizing known cable transfer techniques so as to allow access to the drill floor through the V-door of the drill rig. U.S. Pat. No. 6,220,807 describes an apparatus for carrying out the method of U.S. Pat. No. 5,458,454.

U.S. Pat. No. 6,609,573, issued on Aug. 26, 2003, to H.W.F. Day discloses a pipe handling system for an offshore structure. The pipe handling system transfers the pipes from a horizontal pipe rack adjacent to the drill floor to a vertical orientation in a set-back area of the drill floor where the drill string is made up for lowering downhole. The cantilevered drill floor is utilized with the pipe handling system so as to save platform space.

U.S. Pat. No. 6,705,414, issued on Mar. 16, 2004, to Simpson et al. discloses a tubular transfer system for moving pipe between a substantially horizontal position on the catwalk and a substantially vertical position at the rig floor entry. Bundles of individual tubulars are moved to a process area where a stand make-up/break-out machine makes up the tubular stands. The bucking machine aligns and stabs the connections and makes up the connection to the correct torque. The tubular stand is then transferred from the machine to a stand storage area. A trolley is moved into position over the pick-up area to retrieve the stands. The stands are clamped to the trolley and the trolley is moved from a substantially horizontal position to a substantially vertical position at the rig floor entry. A vertical pipe-racking machine transfers the stands to the traveling equipment. The traveling equipment makes up the stand connection and the stand is run into the hole.

U.S. Pat. No. 6,779,614, issued on Aug. 24, 2004, to M. S. Oser discloses another system and method for transferring pipe. A pipe shuttle is used for moving a pipe joint into a first position and then lifting upwardly toward an upper second position.

In well drilling and well completion operations, it is necessary to lift and properly align lengths of downhole tubulars. For example, in oil or water well drilling, multiple lengths of drill pipe must often be raised from a horizontal position at or near ground level to a vertical position aligned with the centerline of the well. Such lifting and aligning operations require clamps for securely holding the pipe in place as it is lifted. When a pivotally mounted pipe boom is used, this boom must support large loads in several different orientations.

Compounding this problem is the fact that each joint of a length of a downhole tubular must be closely aligned with a string of such tubulars after it has been lifted to the vertical position, such as when a drill pipe or casing is made up. A clamp, or gripper, for this purpose should preferably provide a necessary alignment for downhole tubulars having various diameters, without any adjustment. Proper alignment has been a problem with many such clamps, or grippers, of the prior art, especially those employing pivoted clamping jaws. When pivoted clamping jaws are used, there is a tendency for the center of the downhole tubular to vary as a function of the diameter of the tubular being clamped.

Various patents and patent applications relate to grippers of tubular handling apparatus. For example, U.S. patent application Ser. No. 12/111,907, filed on Apr. 29, 2008, by the present inventor, discloses a pipe gripping apparatus having a first jaw with a pipe-contacting surface at one end thereof, a second jaw having a pipe-contacting surface at one end thereof, a tongue having a pipe-contacting surface at one end thereof, and an actuator connected to the first and second jaws and to the tongue. The actuator serves to move the first and second jaws and the tongue such that the pipe-contacting surfaces thereof move radially inwardly simultaneously for a substantially identical distance. A first link pivotally connects the tongue with the first jaw. A second link pivotally connects the tongue with the second jaw. The first and second links extend angularly outwardly from the tongue. The first and second pivot points of each jaw have a distance unequal to a distance between the first pivot point and pipe-contacting surface of each jaw. The pipe-contacting surfaces can be elastomeric pads, toothed dies, or rollers.

U.S. Pat. No. 3,280,920, issued on Oct. 25, 1966, to P. Scott discloses a portable apparatus for drilling downhole wells. This apparatus has a mast having an open side and a means for supporting a string of drill pipes rotated within the mast. A means for raising and lowering a string of drill pipes in a rectilinear direction parallel to the longitudinal centerline of the mast is provided. This apparatus includes a hydraulic cylinder connected through a suitable arrangement of lines and sheaves so as to apply positive force upon the power swivel so as to move the swivel upwardly or downwardly in the mast as desired. This swivel is mounted on a wheeled carriage which runs on suitable tracks carried by the mast. An elongate frame is pivotably attached to the lower end of the mast for swinging movement to an open side of the mast between a substantially horizontal position and an upright position. Releasable clamps are adapted to grip a section of drill pipe mounted on the frame for a limited longitudinal reciprocating motion thereon.

U.S. Pat. No. 3,365,762, issued on Jan. 30, 1968, to W. H. Spiri discloses a well pipe gripping structure having a slip body having a pipe gripping insert which is slidably movable horizontally into an arcuate guideway in the slip body. The slip body is retained within the guideway by upper and lower lips on the body. The lips have asymmetric retaining surfaces. The inserts are provided with teeth which advance vertically as the teeth advance circularly. The teeth of one insert are positioned out of alignment with the teeth of the other insert to increase the resistance to rotation of the pipe within the slip structure.

U.S. Pat. No. 3,561,811, issued on Feb. 9, 1971, to J. W. Turner, Jr. discloses a well drilling rig having a pipe racker apparatus in which a number of racker arms are controllable from a remote location to engage drill pipe tool joints and drill collars. One of the arms has a head for supporting the weight of lengths of pipe or drill collars being added to or removed from the drill string.

U.S. Pat. No. 3,702,640, issued on Nov. 14, 1972, to Cintract et al. discloses a tipping girder with a transfer of tubular elements. This tipping girder has a plurality of adjustable guide nippers movably positioned on the girder for movement transverse to the longitudinal axis thereof. There are adjustable locking nippers movably mounted on the girder for movement parallel to and transverse to the longitudinal axis thereof. The locking nippers are constructed to automatically engage and lock a rod on the girder when it is moved away from the horizontal position.

U.S. Pat. No. 3,806,021, issued on Apr. 23, 1974, to Moroz et al. discloses a pipe centering apparatus. This apparatus has a carriage with a column mounted thereon to support a pipe end jointing mechanism. The carriage has a receptacle together with the column. The column pivotally supports a cantilever member of which the free extremity pivotably supports the pipe end jointing mechanism including coaxially arranged grippers adapted to retain the ends of the pipe.

U.S. Pat. No. 4,303,270, issued on Dec. 1, 1981, to H. L. Adair discloses a self-centering clamp for downhole tubulars. This clamp includes first and second opposed clamping members guided along a clamping axis by first and second guide channels defined by a frame. Each clamping member defines a hydraulic cylinder in which is disposed a piston which is rigidly mounted to the frame. A rack is coupled to move with each of the clamping members. These racks are interconnected via a pinion gear which meshes with both racks so that the two clamping members move in a counter-directional manner and remain equidistant from a central point on the clamping axis.

U.S. Pat. No. 4,403,897, issued on Sep. 13, 1983, to C. A. Willis discloses a self-centering clamp for drilling tubulars. This self-centering clamp includes first and second transverse guide rods. Two opposed clamping jaws are guided along the first guide rod. These jaws are positioned by two opposed rocker arms, each of which is mounted to a cross brace which slides along the second guide rod. The rocker arms are symmetrically positioned by a link mechanism which also slides along the second guide rod and by a hydraulic cylinder coupled between the two rocker arms. The frame is pivotally mounted to a pipe boom so as to rotate about an axis parallel to the clamped pipe and transverse to the first and second guide rods.

U.S. Pat. No. 4,650,237, issued on Mar. 17, 1987, to R. J. Lessway discloses an automatic centering and gripping apparatus which includes a housing in which is slidably mounted on a longitudinal movable operator body. A pair of gripper arms is slidably mounted on the operator body. Each gripper arm carries a gripper member engageable with a workpiece. The gripper members are moved longitudinally and laterally into gripping engagement with a workpiece when the operator body is moved in one longitudinal direction. They are correspondingly disengaged from the workpiece when the operator body is moved in the other longitudinal direction.

U.S. Pat. No. 5,609,226, issued on Mar. 11, 1997, to D. J. Penisson discloses a slip-type gripping assembly having an outer body defining a longitudinal through opening for receipt of the object. A number of slip bodies are circumferentially spaced about the through opening and are radially movable toward and away from the locus of the object. Each slip body is pivotable about a generally longitudinal axis and generally circumferentially centered with respect to the slip body as well as about a tangential axis. A respective force transfer formation is cooperative between each slip body and the outer body for transferring radial force therebetween while permitting the pivoting.

U.S. Pat. No. 5,848,647, issued on Dec. 15, 1998, to Webre et al. discloses a pipe gripping apparatus for angularly adapting two misaligned pipes on one or more pipe strings. The apparatus has a housing having internal, opposing downwardly-curved surfaces therein and forming a longitudinal opening for passing a portion of at least one tubing string therethrough. A plurality of slip carriers each has an exterior surface contoured to match the downwardly curved surface and has a downwardly inclined interior surface. Each slip carrier is in movable connection with one of the curved surfaces of the housing. A plurality of slips has downwardly inclined exterior surfaces and longitudinal channels formed on an internal surface for holding gripping elements for gripping a portion of the pipe.

U.S. Pat. No. 5,992,801, issued on Nov. 30, 1999, to C. A. Torres discloses a pipe gripping assembly and method. This pipe gripping assembly has a primary pipe gripping mechanism and a backup and a secondary pipe gripping mechanism carried in a single tapered slip bowl. The primary gripping mechanism employs smooth surface pipe dies that set against and grip and hold the pipe without damaging the pipe surface. After the primary mechanism is set, toothed dies in the secondary gripping mechanism are automatically engaged with the pipe with only a minimal pipe gripping force. Additional slippage of the pipe through the smooth dies sets the toothed dies down against a wedging surface to grip and hold the pipe to stop its downward movement. A resilient biasing device is used to urge the toothed dies away from the pipe before the smooth dies are set.

U.S. Pat. No. 5,993,140, issued on Nov. 30, 1999, to A. Crippa discloses an apparatus for loading pipes onto processing machines. This apparatus has a handler arm with a first segment and a second segment disposed in succession. Kinematic members are adapted to determine a fixed ratio between the rotation angles of the segments about the respective hinging axes.

U.S. Pat. No. 6,543,551, issued Apr. 8, 2003, to Sparks et al. discloses an automatic pipe handling device which includes a support frame mounted on a boring device. Removable pipe racks can be placed in position on the support frame to deliver pipe to the spindle axis or to remove pipe therefrom as required. The pipe sections are removed from the pipe rack and positioned on the spindle axis by pipe grippers mounted on hydraulic cylinders mounted on a rotating longitudinal shaft. The grippers and shaft simultaneously return the used pipe sections for storage to the pipe rack.

U.S. Pat. No. 6,543,555, issued on Apr. 8, 2003, to M. Casagrande discloses an automatic loader for drill rods adapted to be used in association with a boring machine. The automatic motor has a store containing a plurality of drill rods and a movement assembly that is able to selectively remove, one at a time, the drill rods from the store to position them on the guide and drive assembly. The movement assembly is arranged in an intermediate position between the store and the guide and drive assembly so as to not interfere with the latter during the removal of the drill rods from the store.

U.S. Pat. No. 6,845,814, issued on Jan. 25, 2005, to Mason et al. discloses a pipe-gripping structure having load rings. In particular, a rotary slip supports a drill string having a plurality of slip segments connected to define an opening for insertion of the drill string. Each slip segment has a head region, a toe region, and an inner radial surface axially extending between the head and toe regions. The inner radial surface of each slip segment has a circumferential groove. A plurality of axially aligned drill string gripping inserts is attached to each slip segment between the head region and the circumferential groove. Each insert has a gripping surface for contacting the drill string.

U.S. Pat. No. 7,055,594, issued on Jun. 6, 2006, to Springett et al. discloses a pipe gripper and top drive system in which the pipe gripping system is located beneath the top drive unit. The pipe gripping system has an open throat for receiving a tubular to be gripped by the pipe gripping system. The gripping system has a body with first and second jaws movably connected thereto and a piston/cylinder assembly movably interconnected with each jaw for moving the jaws to clamp and then to rotate the pipe.

U.S. Pat. No. 7,090,035, issued on Aug. 15, 2006, to G. Lesko discloses a method and system for connecting pipe to a top drive motor. This system includes a top drive motor that tilts about a horizontal axis and a pipe launcher that brings joints of pipe up to the drilling platform for connection with a top drive motor at a safe and convenient height above the platform. The top drive motor further includes a clamping assembly that grasps and pulls the joint of the pipe to the motor as the connection is being made. The clamp assembly supports the motor-pipe connection as the top-drive motor is raised in the drilling mast of the rig, bringing the joint of pipe up into a vertical orientation for connection with the drill tubing string.

U.S. Pat. No. 7,121,166 B2, issued on Oct. 17, 2006, to Drzewiecki discloses a tong assembly that has a body and a center member slidable relative to the body. A pair of clamping arms is rotatably connected to the body. The clamping arms are connected to the center member such that as the center member slides relative to the body, the clamping arms rotate relative to the body. The assembly also comprises a plurality of die assemblies, wherein at least one die assembly is mounted to each clamping arm and at least one die assembly is mounted to the center member.

A problem associated with prior art tubular handling apparatus is that the size of the main rotating structural member of the apparatus can limit the size of the tubular that is moved from a horizontal to a vertical position and vice versa. The tubulars can also be too long to fit within the V-door of an oil derrick. Tubulars can also be too large and too long to fit or pass by various other equipment associated with oil and gas drilling and production. The tubular may have a length that makes it difficult to pass through the opening in the boom, or main rotating structural member, of the tubular handling apparatus. Thus, there is a need to manipulate a position of a tubular that is gripped by a tubular handling apparatus so as to overcome these limitations.

It is an object of the present invention to deliver tubulars to and from a well head.

It is another object of the present invention to change a position of a tubular held by a tubular gripping apparatus while the apparatus moves between a first position and a second position.

It is still another object of the present invention to move tubulars vertically upward and downward above a well head.

It is another object of the present invention to manipulate a position of a tubular with the grippers of a tubular handling apparatus.

It is another object of the present invention to provide correct alignment of tubulars over a well head.

It is another object of the present invention to provide an apparatus that allows relatively unskilled workers to carry out tubular handling activities.

It is still another object of the present invention to provide an apparatus that has grippers that translate along a side of the stab frame of the apparatus.

It is a further object of the present invention to provide a tubular handling apparatus that facilitates the ability to introduce and/or remove the tubular through a V-door of a drilling rig.

These and other objects and advantages of the present invention will become apparent from a reading of the attached specification and appended claims.

BRIEF SUMMARY OF THE INVENTION

The present invention includes a tubular handling apparatus comprising a main rotating structural member pivotally movable between a first position and a second position, an arm interconnected to the main rotating structural member so that the arm is suitable for pivoting between a home position and an extended position, a frame connected to an end of the arm opposite the main rotating structural member, and at least a pair of grippers affixed to an end of the arm opposite the main rotating structural member. The grippers grip a surface of a tubular and are suitable for translating along a side of the frame.

The pair of grippers has a connection bar connected to the pair of grippers and extends therebetween. The connection bar is suitable for translating the grippers for a substantially identical distance with respect to each other along the side of the frame.

The apparatus further comprises a means of translating the grippers along the side of the frame. The means for translating comprises a first translating mechanism positioned between the side of the frame and the first gripper, a second translating mechanism positioned between the side of the stab frame and the second gripper, and tracks formed on the side of the stab frame. The means for translating moves the first gripper and the second gripper along the tracks.

The first gripper and the second gripper are suitable for translating along the side of the stab frame while the arm pivots between the home position and the extended position. The arm is connected to an opposite side of the stab frame. The first gripper and the second gripper are suitable for translating along the side of the stab frame while the main rotating structural member pivots between the first position and the second position.

Each of the first and second grippers comprises a first jaw having a tubular-contacting surface at an end thereof, a second jaw having a tubular-contacting surface at an end thereof, a drive yoke having a tubular-contacting surface at an end thereof, and an actuator means connected to the drive yoke. The drive yoke is connected to the first jaw and to the second jaw. The actuator means moves the first and second jaws and the drive yoke such that the tubular-contacting surfaces thereof move radially inwardly for a substantially identical distance. Each of the first and second grippers further comprises a first link connected to the first jaw and to the drive yoke, and a second link connected to the second jaw and to the drive yoke. The first link is pivotally connected at a first pivot point to the first jaw. The first link is pivotally connected at a second pivot point to the drive yoke. The second link is pivotally connected at a first pivot point to the second jaw. The second link is pivotally connected at a second pivot point to the drive yoke. The first link is positioned between the first jaw and the drive yoke. The second link is positioned between the second jaw and the drive yoke.

The tubular handling apparatus can further comprise a lever assembly pivotally connected to the main rotating structural member where the lever assembly has a first portion extending outwardly at an obtuse angle with respect to a second portion, a skid extending in a horizontal orientation below the main rotating structural member, a link pivotally connected to the second portion of the lever assembly, and a brace having an end pivotally connected to the main rotating structural member and an opposite end pivotally connected to the arm. The link pivots at an end of the second portion opposite the first portion so as to move relative to a movement of the main rotating structural member between the first position and the second position. The arm is pivotally connected at one end to the first portion of the lever assembly and extends outwardly therefrom. The main rotating structural member is pivotally mounted on the skid.

DETAILED DESCRIPTION OF THE INVENTION

Figure 1:
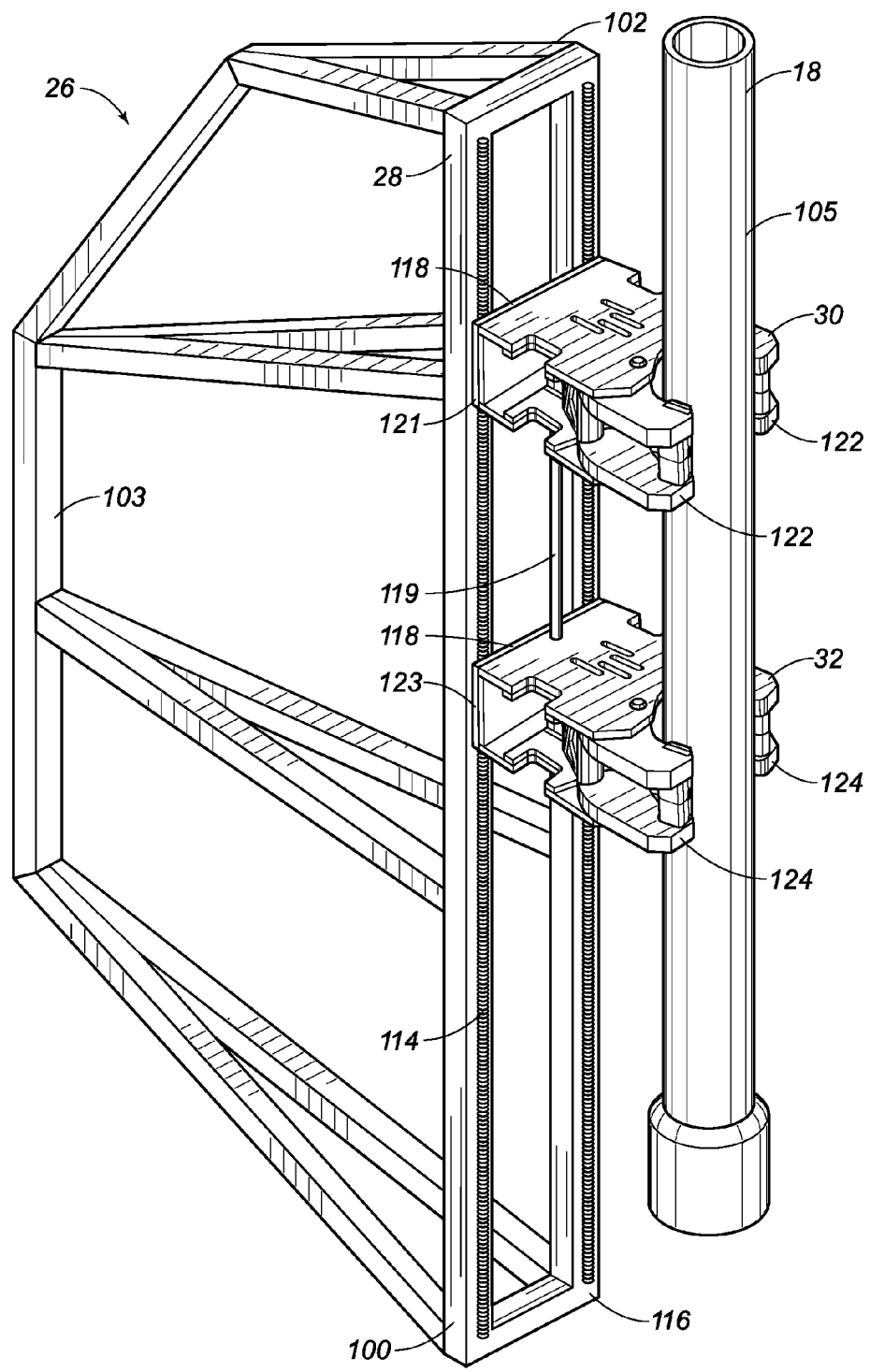
FIG. 1 shows an isolated perspective view of the gripper means of the preferred embodiment of the tubular handling apparatus of the present invention.

Referring to FIG. 1, there is shown an isolated perspective view of the gripper assembly 26 of the present invention. The gripper assembly 26 has a stab frame 28, a first gripper 30 attached to a side 116 of the stab frame 28, and a second gripper 32 attached to the side 116 of the stab frame 28 below the first gripper 30. The stab frame 28 has an opposite side 103 connected to the arm of the tubular handling apparatus. The stab frame 28 has an end 100 and an opposite end 102. The grippers 30 and 32 translate along a track 114 between the ends 100 and 102 of the stab frame 28. The track 114 is formed on the side 116 of the stab frame 28.

A means for translating 118 is positioned between the side 116 of the stab frame 28 and each of the first and second grippers 30 and 32. The means for translating moves the grippers 30 and 32 relative to the side 116 of the stab frame 28. The means for translating 118 has a first translating mechanism 121 and a second translating mechanism 123. The first translating mechanism 121 is positioned between the side 116 of the stab frame 28 and the first gripper 30. The second translating mechanism 123 is positioned between the side 116 of the stab frame 28 and the second gripper 32. The first and second translating mechanisms 121 and 123 travel along tracks 114 so as to move the grippers 30 and 32 along the side 116 of the stab frame 28. The first gripper 30 is connected to the second gripper 32 by connection bar 119. The connection bar 119 connects the top of the second gripper 32 with the bottom of the first gripper 30. The connection bar 119 causes the first and second grippers 30 and 32 to translate along the side 116 of the stab frame 28 for substantially identical distances. The connection bar 119 also causes the grippers 30 and 32 to travel in the same direction.

As used herein, the term "means for translating" can encompass a wide variety of operational mechanisms. A pneumatic or hydraulic cylinder, or several cylinders, can be connected to at least one of the grippers 30 and 32 so as to translate the grippers along the side of the stab frame 28. Alternatively, a geared mechanism with a motor can be used so as to drive the grippers 30 and 32 along the side of the stab frame 28. Still further, each of the grippers 30 and 32 can be connected to a driven pinion that rides along a rack positioned within this stab frame 28. It was possible that a cable can be connected to one of the grippers to extend over a pulley mechanism in order to lift and lower the grippers. Various other techniques can also be employed in order to achieve this translatable movement of the grippers 30 and 32.

The first gripper 30 has jaws 122 that grip an outer surface 105 of the tubular 18. Likewise, the second gripper 32 has jaws 124 that grip the outer surface 105 of the tubular 18. The jaws 124 of the second gripper 32 and the jaws 122 of the first gripper 30 are in generally vertical alignment so that the tubular 18 is held relatively parallel to the side 116 of the stab frame 28. The grippers 30 and 32 travel between the ends 101 and 102 of the stab frame 28. As is disclosed in the present invention, the grippers 30 and 32 travel while the tubular handling apparatus pivots between the first and second positions (discussed in more detail below).

Figure 2:
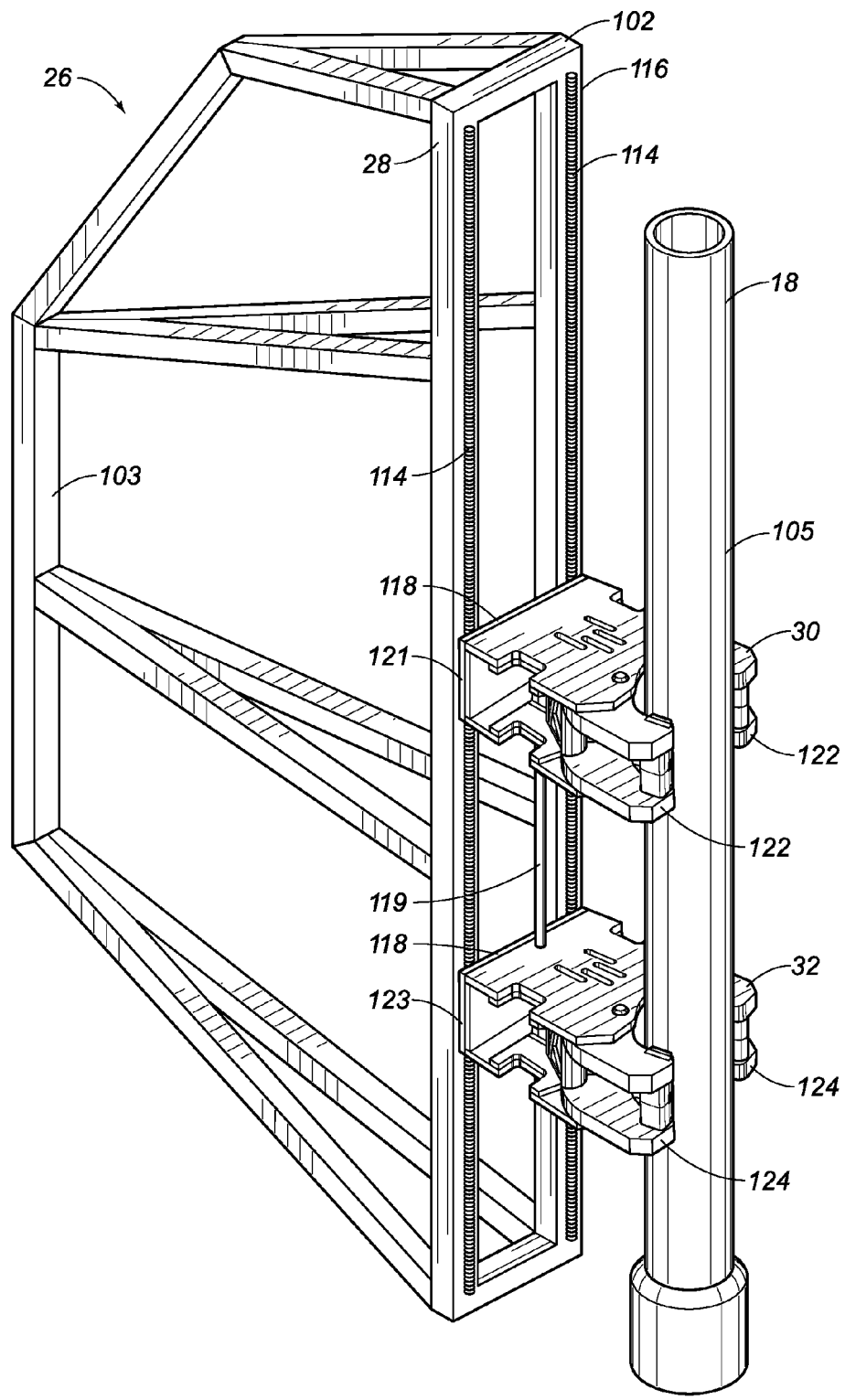
FIG. 2 shows an isolated perspective view of the gripper means of the preferred embodiment of the tubular handling apparatus with the grippers translated downwardly along the side of the stab frame.

Referring to FIG. 2, there is shown an isolated perspective view of the gripper assembly 26 of the tubular handling apparatus of the present invention, with the first and second grippers 30 and 32 translated downwardly along the side 116 of the stab frame 28. The first translating mechanism 121 and the second translating mechanism 123 cause the first and second grippers 30 and 32, respectively, to travel along the tracks 114 toward end 100 of the stab frame 28 away from end 102 of the stab frame 28. The connection bar 119 that connects the top of the second gripper 32 with the bottom of the first gripper 30 cause the first and second grippers 30 and 32 to travel for substantially identical distances. The jaws 122 of the first gripper 30 and the jaws 124 of the second gripper 32 grip the outer surface 105 of the tubular 18 while the grippers 30 and 32 travel along the tracks 114. The means for translating 118 enables the grippers 30 and 32 to travel between the ends 100 and 102 of the stab frame 28 independently of the travel of the tubular handling apparatus between the first and second positions.

Figure 3:
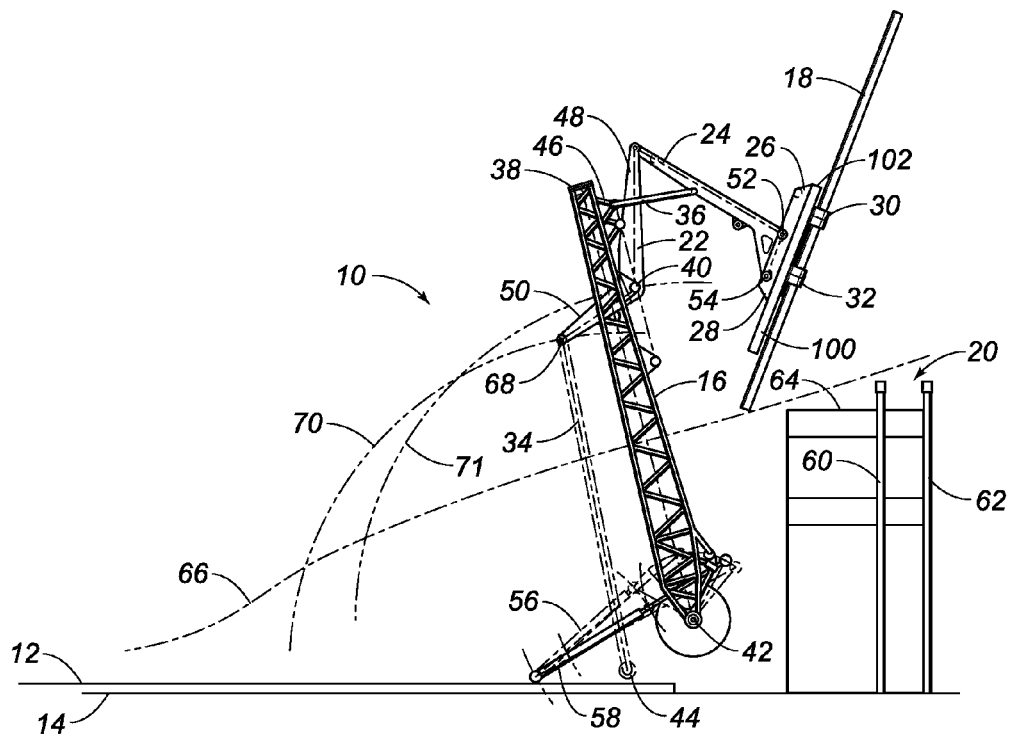
FIG. 3 shows a side elevational view of the preferred embodiment of the tubular handling apparatus.

Referring to FIG. 3, there is shown a side elevational view of the preferred embodiment of the tubular handling apparatus 10 of the present invention. The tubular handling apparatus 10 is mounted on a skid 12 that is supported upon the bed 14 of a vehicle, such as a truck. The tubular handling apparatus 10 includes a main rotating structural member 16 that is pivotally movable between a first position and a second position. In FIG. 3, an intermediate position of the tubular handling apparatus 10 is particularly shown. In this position, the tubular 18 is illustrated in its position prior to installation on the drill rig 20. A lever assembly 22 is pivotally connected to the main rotating structural member 16. An arm 24 is pivotally connected to an end of the lever assembly 22 opposite the main rotating structural member 16. The arm 24 has a home position and an extended position, and in FIG. 3, the arm 24 is shown in a position between the home position and the extended position. The home position of the arm 24 can be seen in FIG. 4 below. The extended position of the arm 24 can be seen in FIG. 7 below. A gripper assembly 26 is fixedly connected to an end of the arm 24 opposite the lever assembly 22. The gripper assembly 26 includes a stab frame 28 and grippers 30 and 32. A link 34 has one end pivotally connected to the skid 12 and an opposite end pivotally connected to the end of the lever assembly 22 opposite the arm 24. A brace 36 is pivotally connected to the main rotating structural member 16 and also pivotally connected to the arm 24 between the lever assembly 22 and the stab frame 28 of gripper assembly 26.

In the present invention, the main rotating structural member 16 is a structural framework of struts, cross members and beams. In particular, in the present invention, the main rotating structural member 16 is configured so as to have an open interior such that the tubular 18 will be able to be lifted in a manner so as to pass through the interior of the main rotating structural member 16. As such, the end 38 of the main rotating structural member 16 should be strongly reinforced so as to provide the necessary structural integrity to the main rotating structural member 16. A lug 40 extends outwardly from one side of the main rotating structural member 16. This lug 40 is suitable for pivotable connection to the lever assembly 22. The main rotating structural member 16 is pivotally connected at the opposite end 42 to a location on the skid 12. The pivotable connection at end 42 of the main rotating structural member 16 is located in offset relationship and above the pivotable connection 44 of the link 34 with the skid 12. A small frame member 46 extends outwardly from the side of the main rotating structural member 16 opposite the link 34. This frame assembly 46 has a pivotable connection with the brace 36.

The lever assembly 22 includes a first portion 48 and a second portion 50. The first portion 48 extends at an obtuse angle with respect to the second portion 50. The link 34 is pivotally connected to the end of the second portion 50 opposite the first portion 48. The arm 24 is pivotally connected to the end of the first portion 48 opposite the second portion 50. The lug 40 of the main rotating structural member 16 is pivotally connected in an area generally between the first portion 48 and the second portion 50. This unique arrangement of the lever assembly 22 facilitates the ability of the present invention to carry out the movement of the tubular 18 between the horizontal orientation and the vertical orientation.

The arm 24 has an end pivotally connected to the end of the first portion 48 of the lever assembly 22. The opposite end of the arm 24 is connected to the gripper assembly 26. In particular, a pair of pin connections engages a surface of the body 28 of the gripper assembly 26 so as to fixedly position the gripper assembly 26 with respect to the end of the arm 24. The pin connections 52 and 54 can be in the nature of bolts, or other fasteners, so as to strongly connect the stab frame 28 of the gripper assembly 26 with the arm 24. The bolts associated with pin connections 52 and 54 can be removed such that other gripper assembly 26 can be affixed to the end of the arm 24. As such, the tubular handling apparatus 10 of the present invention can be adaptable to various sizes of tubular 18 and various heights of drilling rigs 20.

The gripper assembly 26 includes the stab frame 28 with the grippers 30 and 32 translatable along the length of the stab frame 28. This vertical translation of the grippers 30 and 32 allows the tubular 18 to be properly moved upwardly and downwardly once the vertical orientation of the tubular 18 is achieved. The grippers 30 and 32 are in the nature of conventional grippers which can open and close so as to engage the outer surface of the tubular 18, as desired.

The link 34 is an elongate member that extends from the pivotable connection 44 to the pivotable connection 68 of the second portion 50 of the lever assembly 22. The link 34 is non-extensible and extends generally adjacent to the opposite side from the main rotating structural member 16 from that of the arm 24. The link 34 will generally move relative to the movement of the main rotating structural member 16. The brace 36 is pivotally connected to the small framework 46 associated with main rotating structural member 16 and is also pivotally connected at a location along the arm 26 between the ends thereof. Brace 36 provides structural support to the arm 24 and also facilitates the desired movement of the arm 24 during the movement of the tubular 18 between the horizontal orientation and the vertical orientation.

Actuators 56 and 58 are illustrated as having one end connected to the skid 12 and an opposite end connected to the main rotating structural member 16 in a location above the end 42. When the actuators 56 and 58 are activated, they will pivot the main rotating structural member 16 upwardly from the horizontal orientation ultimately to a position beyond vertical so as to cause the tubular 18 to achieve a vertical orientation. Within the concept of the present invention, a single hydraulic actuator can be utilized instead of the pair of hydraulic actuators 56 and 58, as illustrated in FIG. 3.

The drilling rig 20 is illustrated as having drill pipes 60 and 62 extending upwardly so as to have an end above the drill floor 64. When the tubular 18 is in its vertical orientation, the translatable movement of the grippers 30 and 32 can be utilized so as to cause the end of the tubular 18 to engage with the box of one of the drill pipes 60 and 62.

In FIG. 3, the general movement of the bottom end of the tubular 18 is illustrated by line 66. The movement of the pivot point 68 of the connection between the lever assembly 22 and the link 34 is illustrated by line 70. Curved line 71 illustrates the movement of the pivotable connection 40 between the main rotating structural member 16 and the lever assembly 22.

In the present invention, the coordinated movement of each of the non-extensible members of the apparatus 10 is achieved with proper sizing and angular relationships. In essence, the present invention provides a four-bar link between the various components. As a result, the movement of the tubular 18 between a horizontal orientation and a vertical orientation can be achieved purely through the mechanics associated with the various components. As can be seen, only a single hydraulic actuator may be necessary so as to achieve this desired movement. There does not need to be coordinated movement of hydraulic actuators. The hydraulic actuators are only used for the pivoting of the main rotating structural member 16. Because the skid 12 is located on the bed of a vehicle 14, the vehicle 14 can be maneuvered into place so as to properly align with the centerline of the drill pipes 60 and 62 of the drilling rig 20. Once the proper alignment is achieved by the vehicle 14, the apparatus 10 can be operated so as to effectively move the drill pipe to its desired position. The gripper assemblies of the present invention allow the tubular 18 to be moved upwardly and downwardly for the proper stabbing of the drill pipes 60 and 62. The present invention is adaptable to various lengths of tubulars 18.

The position of the tubular handling apparatus 10 as shown in FIG. 3 is that the apparatus 10 is between the first and second positions, with the apparatus 10 being closer to the second position than the first position. The first and second grippers 30 and 32 of the gripper assembly 26 are traveling between the ends 100 and 102 of the stab frame 28 while the apparatus 10 moves toward the second position. Because the apparatus 10 is near the second position, the grippers 30 and 32 are closer to the end 102 of the stab frame 28 than to end 100 of the stab frame 28.

As such, instead of the complex control mechanisms that are required with prior art systems, the present invention achieves its results by simple maneuvering of the vehicle 14, along with operation of the hydraulic cylinders 56 and 58. All other linkages and movement of the pipe 18 are achieved purely because of the mechanical connections between the various components, as well as the translation of grippers 30, 32 along track 114. As such, the present invention assures a precise, self-centering of the pipe 18 with respect to the desired connecting pipe. This is accomplished with only a single degree of freedom in the pipe handling system.

Figure 4:
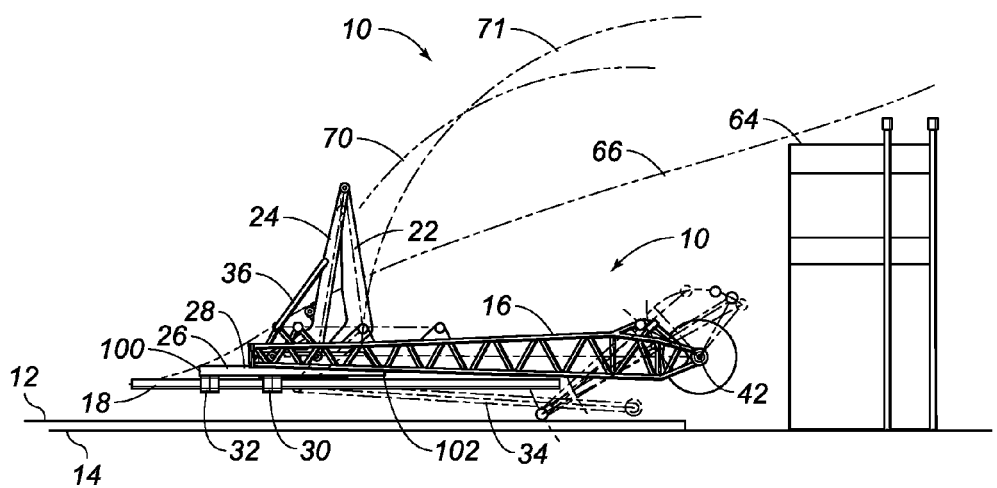
FIG. 4 shows a side elevational view of the tubular handling apparatus in the first position.

Referring to FIG. 4, there is shown a side elevational view of the apparatus 10 of the present invention in the first position, with the drill tubular 18 in a generally horizontal orientation. The main rotating structural member 16 is in the first position, which is a horizontal orientation. The arm 24 is in a home position. In the disclosed invention, the drill tubular 18 is delivered to the grippers 30 and 32 of the gripper assembly 26 in a position below the main rotating structural member 16. In particular, the drill pipe 18 can be loaded upon the skid 12 in a location generally adjacent to the grippers 30 and 32 associated with the gripper assembly 26. As such, the present invention facilitates the easy delivery of the drill pipe 18 to the desired location. The grippers 30 and 32 grip the outer surface of the tubular 18 in this horizontal orientation.

In FIG. 4, it can be seen that the main rotating structural member 16 resides above the tubular 18 and in generally parallel relationship to the top surface of the skid 12. The lever assembly 22 is suitably pivoted so that the arm 24 extends through the interior of the framework of the main rotating structural member 16 and such that the gripper assembly 26 engages the tubular 18. The brace 36 resides in connection with the small frame member 46 of the main rotating structural member 16 and also is pivotally connected to the arm 24. The link 34 will reside below the main rotating structural member 16 generally adjacent to the upper surface of the skid 12 and is connected to the second portion 50 of the lever assembly 22 below the main rotating structural member 16.

When the apparatus 10 is in the first position, or horizontal position, the grippers 30 and 32 are generally closer to end 100 of the stab frame 28 than they are to end 102 of the stab frame 28. In FIG. 4, the second gripper 32 is adjacent the end 100 of the stab frame 28. The grippers 30 and 32 hold the tubular 18 in a position so that it clears the framework of the main rotating structural member 16 when the main rotating structural member 16 pivots about point 42 so as to raise the apparatus 10 to the drill floor 64.

Figure 5:
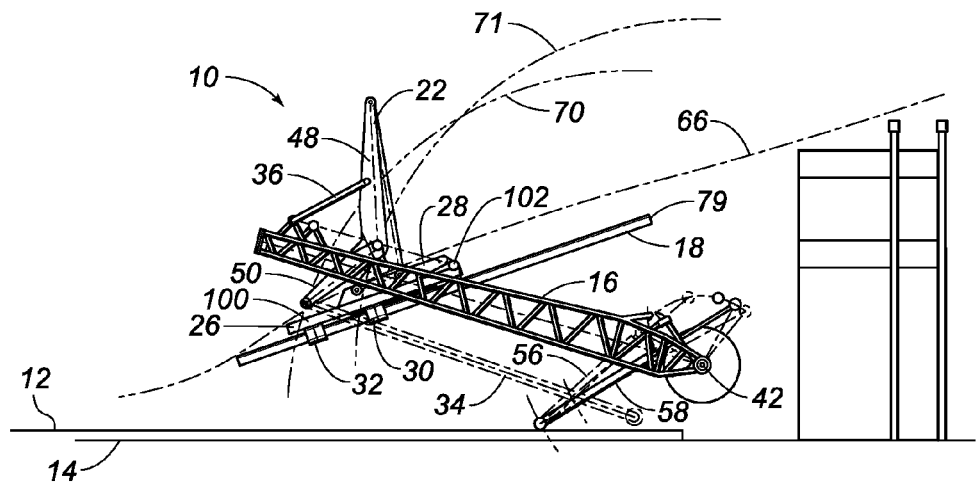
FIG. 5 shows a side elevational view of the tubular handling apparatus moving from the first position to the second position.

Referring to FIG. 5, there is shown the apparatus 10 in an intermediate position, with the main rotating structural member 16 positioned between the first and second positions. As can be seen, the gripper assembly 26 is engaged with the tubular 18. The lever assembly 22 pivots and the grippers 30 and 32 translate along the stab frame 28 so that the end 79 of tubular 18 passes through the interior of the framework of the main rotating structural member 16. Also, the arm 24 associated with the gripper assembly 26 serves to move the stab frame 28 of the gripper assembly 26 through the interior of the framework of the main rotating structural member 16. The grippers 30 and 32 translate along the side of the stab frame 28 while the arm 24 moves between the home position in FIG. 4 and the extended position shown in FIG. 7. The brace 36 pulls on the first portion 48 of lever assembly 22 so as cause this motion to occur. The link 34 pulls on the end of the second portion 50 of the lever assembly 22 so as to draw the first portion 48 upwardly and to cause the movement of the stab frame 28 of the gripper assembly 26. The hydraulic actuators 56 and 58 have been operated so as to urge the main rotating structural member 16 pivotally upwardly away from the first position. When moving from the first position to the second position, the first and second grippers 30 and 32 begin to move away from end 100 of the stab frame 28 and toward end 102 of the stab frame 28. Compared with FIG. 4, the second gripper 32 is further away from end 100 of the stab frame 28. Thus, the first and second grippers 30 and 32 of the gripper assembly 26 translate along the side 116 of the stab frame 28 while the main rotating structural member 16 pivots from the first position to the second position.

Figure 6:
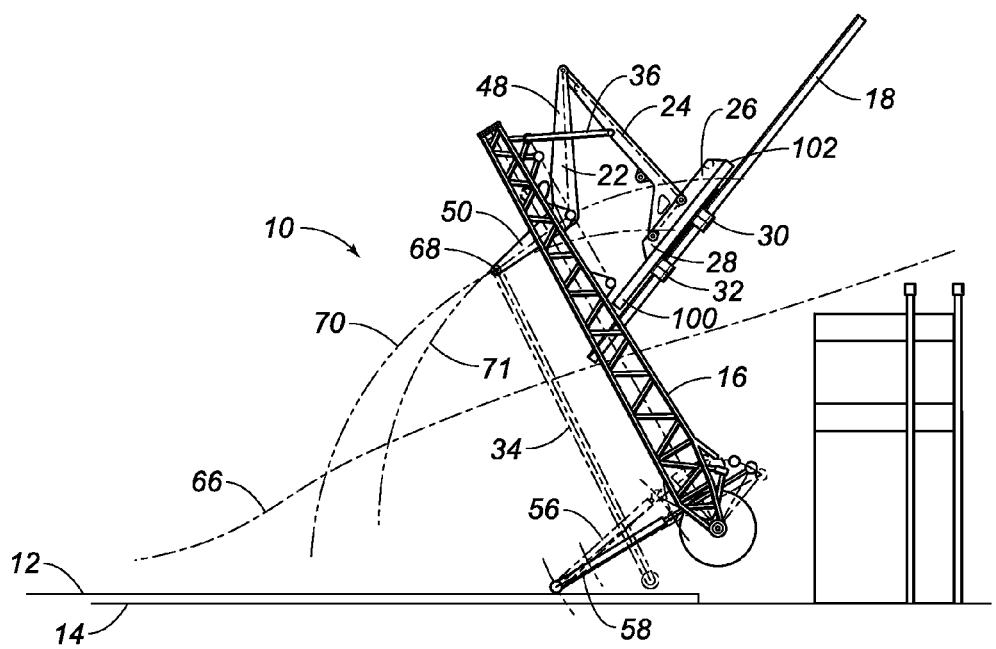
FIG. 6 shows a side elevational view of the tubular handling apparatus moving further from the first position to the second position.

Referring to FIG. 6, there is shown a further intermediate movement of the main rotating structural member 16 of the apparatus 10 from the first position to the second position. Once again, the hydraulic actuators 56 and 58 urge the main rotating structural member 16 angularly upwardly away from the top surface of the skid 12. This causes the link 34 to have a pulling force on the pivotal connection 68 of the second portion 50 of the lever assembly 22. This causes the first portion 48 of the lever assembly 22 to move upwardly, thereby causing the arm 24, in combination with the brace 36, to lift the gripping assembly 26 further upwardly and draw the tubular 18 completely through the interior of the main rotating structural member 16. The tubular 18 easily passes through the interior of the main rotating structural member 16 because the grippers 30 and 32 translated along the side of the stab frame 28 so as to keep the end of the tubular 18 from contacting the framework of the main rotating structural member 16. As can be seen, the relative size and relation of the various components of the present invention achieve the movement of the tubular 18 without the need for separate hydraulic actuators.

As can be seen, first and second grippers 30 and 32 of the gripper assembly 26 have traveled further along the side of the stab frame 28. That is, the grippers 30 and 32 move closer to the end 102 of the stab frame 28 and further away from end 100 of the stab frame 28 as the main rotating structural member 16 approaches the second position, or vertical orientation.

Figure 7:
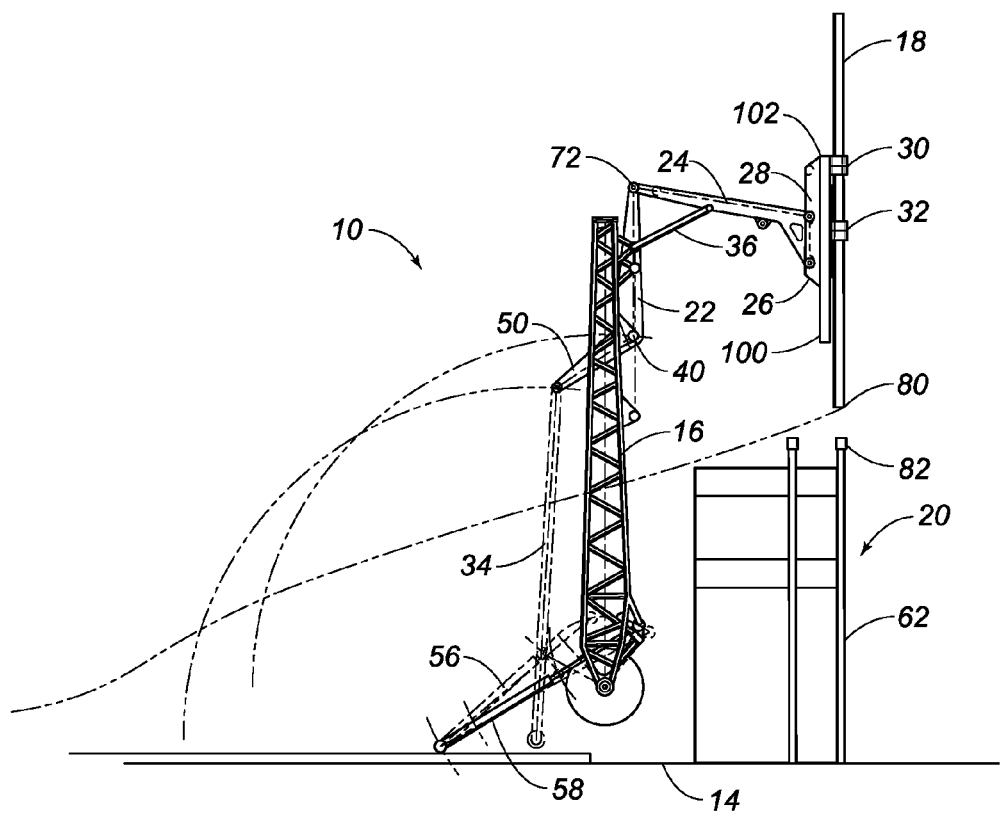
FIG. 7 shows a side elevational view of the tubular handling apparatus in the second position.

FIGS. 5 and 6 show the main rotating structural member 16 in positions between the first position shown in FIG. 4 and the second position shown in FIG. 7. Additionally, FIGS. 5 and 6 show the arm 24 in positions between the home position shown in FIG. 4 and the extended position shown in FIG. 7. When viewing FIGS. 4 through 7 in series, it can be seen that the grippers 30 and 32 translate along the side of the stab frame 28 while the main rotating structural member 16 pivots between the first and second positions and while the arm pivots between the home and extended positions.

Referring to FIG. 7, there is shown a side elevational view of the apparatus 10 in the second position, with the drill tubular 18 in its vertical orientation. As can be seen, the drill tubular 18 is positioned directly above the underlying pipe 62 on the drilling rig 20. The further upward pivotal movement of the main rotating structural member 16 is caused by the hydraulic cylinders 56 and 58. This causes the link 34 to rotate and draw the end of the second portion 50 of the lever assembly 22 downwardly. The lever assembly 22 rotates about the pivot point 40 such that the first portion 48 of the lever assembly 22 has a pivot 72 at its upper end. The brace 36 is now rotated in a position so as to provide support for the arm 24 in this upper position. The gripper assembly 26 has grippers 30 and 32 aligned vertically and in spaced parallel relationship to each other. If any further precise movement is required between the bottom end 80 of the tubular 18 and the upper end 82 of pipe 62, then the vehicle 14 can be moved slightly so as to achieve further precise movement. In the manner described hereinbefore, the tubular 18 has achieved a completely vertical orientation by virtue of the interrelationship of the various components of the present invention and without the need for complex control mechanisms and hydraulics. When the apparatus 10 is in the second position, the grippers 30 and 32 translate along the side 116 of the stab frame 28. The first gripper 30 is adjacent the end 102 of the stab frame 28. The first gripper 30 is furthest from end 100 when the apparatus 10 is in the second position. The grippers 30 and 32, however, can be translated along the side of the stab frame 28 of the gripper assembly 26 between the ends 100 and 102 of the stab frame 28 so as to raise or lower the tubular 18 above the pipe 62 at the well head. Thus, the apparatus 10 of the present invention serves the additional purpose of delivering the tubular 18 to a pipe 62 vertically downwardly at a well head.

The grippers 30 and 32 grip the outer surface of the tubular 18 continuously as the apparatus 10 moves between the first and second positions. When the apparatus 10 delivers tubular 18 to the pipe 62, the grippers 30 and 32 release the tubular 18 at the well head. The apparatus 10 then pivots from the second position to the first position so as to grip another tubular. The grippers 30 and 32 can travel along the side of the stab frame 28 of the gripper assembly 26 so as to be in a proper position near end 100 of the stab frame 28 for gripping another tubular.

In order to install the drill tubular 18 upon the pipe 62, it is only necessary to vertically translate the grippers 30 and 32 on the stab frame 28 of the gripper assembly 26. As such, the end 80 can be stabbed into the box connection 82 of pipe 62. Suitable tongs, spinners, or other mechanisms can be utilized so as to rotate the tubular 18 in order to achieve a desired connection. The grippers 30 and 32 can then be released from the exterior of the tubular 18 and returned back to the original position such that another length of drill pipe can be installed.

Figure 8:
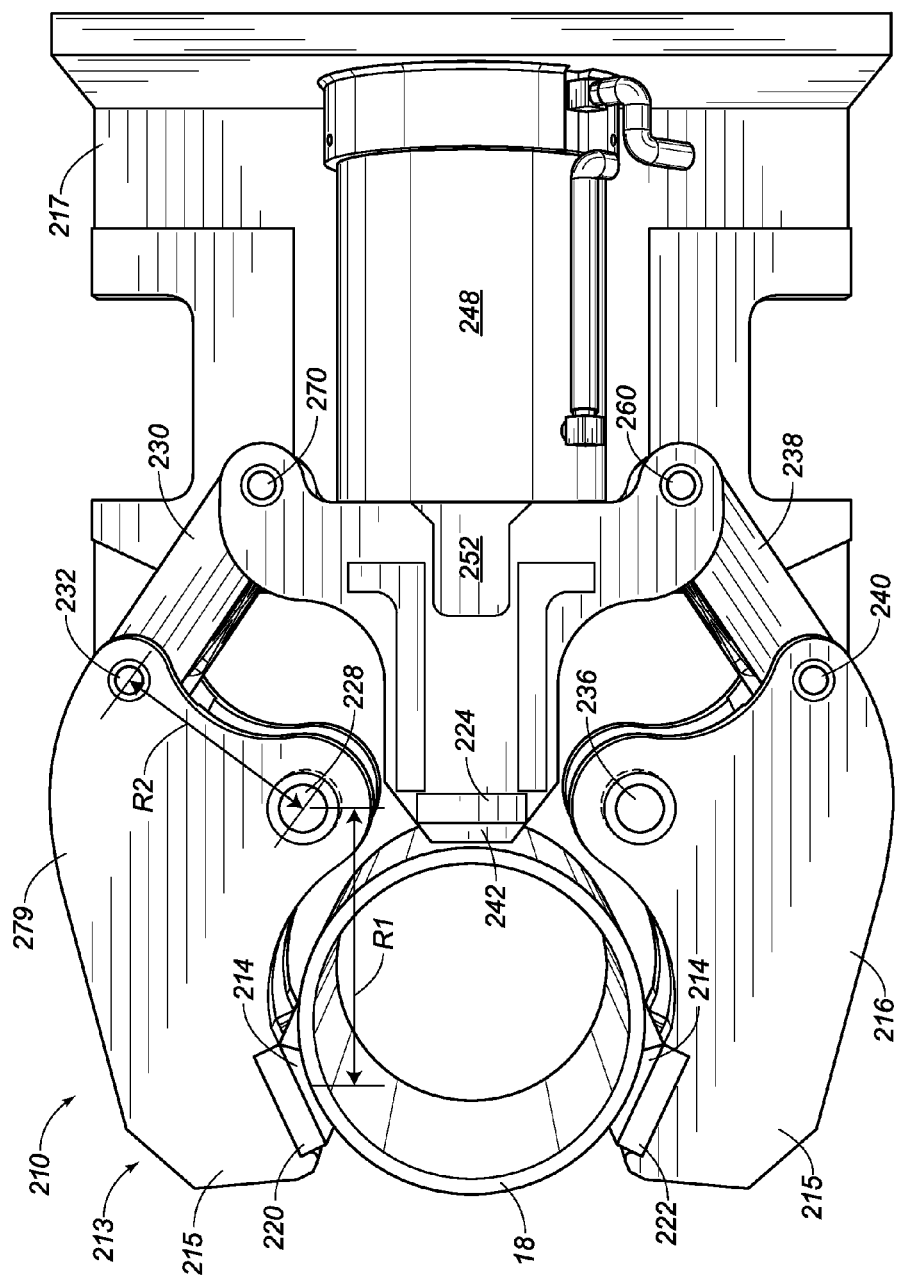
FIG. 8 shows a plan view of a gripper of the tubular handling apparatus of the present invention.

Referring to FIG. 8, there is shown a plan view of the preferred embodiment of a gripper 210 in a second position. Gripper 210 has a first position and second position that is not to be confused with the first and second position of the apparatus 10. In the first position, the jaws 213 of the gripper 210 are open so as to avoid contact of the tubular 18. In the second position shown in FIG. 8, the gripper 210 grips tubular 18. As can be seen in FIG. 8, the gripper 210 has a jaw assembly 213 positioned around the outer surface of the tubular 212. The jaw assembly 213 has tubular gripping surfaces 214 on the ends 215 thereof. The tubular gripping surfaces 214 contact the tubular 18 when the gripper 210 is in the second position. The gripper 210 has a housing 217. The housing 217 covers the top, back, and bottom of the gripper 210. The jaw assembly 213 has a portion that moves within the housing 217. The unique configuration of the jaw assembly 213 allows the gripper 210 of the present invention to grip large and small diameters of tubulars without having to change the jaws of the jaw assembly 213. Thus, the gripper 210 of the present invention eliminates the need for additional adapters and thus removes the associated costs from gripping tubulars 18.

The jaw assembly 213 has a first jaw 279 and a second jaw 216. The first jaw 279 has a pipe-contacting surface 220 at one end 215 thereof. The second jaw 216 has a pipe-contacting surface 222 at one end 215 thereof. The first and second jaws 279 and 216 are connected to a drive yoke 252. A first link 230 is connected to the first jaw 279 and the drive yoke 252. The first link 230 is pivotally connected at a first pivot point 232 to the first jaw 279. The first link 230 is pivotally connected at a second pivot point 270 to the drive yoke 252. A second link 238 is connected to the second jaw 216 and to the drive yoke 252. The second link 238 is connected at a first pivot point 240 to the second jaw 216. The second link 238 is pivotally connected at a second pivot point 260 to the drive yoke 252. An elastomeric pad is the pipe-contacting surface 220 of the first jaw 279. As such, the pipe-contacting surface 220 is slightly flexible so as to avoid any damage to the outer surface of the tubular 18. An elastomeric pad is the pipe-contacting surface 222 of the second jaw 216. The links 230 and 238 assure a proper movement of the jaws 279 and 216 radially inwardly relative to the movement of the drive yoke 252. The links 230 and 238 are anchored to housing 217.

An actuator 248 is interconnected to the first jaw 279, to the second jaw 216 and to the drive yoke 252 so as to move the tubular-contacting surfaces 220, 222 and 242 radially inwardly and simultaneously for an identical distance. The drive yoke 252 is generally an elongated longitudinal member extending toward the tubular 18. An elastomeric pad is located on the end 224 of the drive yoke 252 as the tubular-contacting surface 242. The present invention contemplates that the pipe-contacting surfaces 220, 222 and 242 can be an elastomeric pad of a gripper, a toothed die of a tong, or a roller of a spinner.

The first link 230 has a pivot point 232 at an end opposite pivot point 270. Likewise, the second link 238 has a pivot point 240 at an end opposite pivot point 260. As the drive yoke 252 moves toward the tubular 18, the links 230 and 238 cause the respective jaws 279 and 216 to rotate the pipe-contacting surfaces 220 and 222 inwardly toward the outer surface of tubular 18. If the diameter of tubular 18 is smaller, then the drive yoke 252 will move further toward the tubular 18 so as to cause the jaws 279 and 216 to rotate further inwardly. The movement of the drive yoke 252 causes the tubular-contacting surface 242 to contact the outer surface of tubular 18.

A novel aspect of the gripper 210 of the present invention is that a variety of tubular diameters can be utilized without the need to change the jaws 279 and 216 of the gripping apparatus 210. The present invention automatically grips different diameters of pipe while, at the same time, assuring a centering of such pipes with minimal error. The jaws 279 and 216 have two important measurements, R1 and R2. R1 is the distance between jaw pivot points 232 and 240 and the pipe-contacting surfaces 220 and 222 of the first and second jaws 279 and 216, respectively. R2 is the distance between the first pivot points 232 and 240 of the first and second links 230 and 238 and the jaw pivot points 228 and 236 of the first and second jaws 279 and 216, respectively.

In the gripper 210, distance R1 is not equal to R2. Prior art is limited in that it requires R1 to equal R2. Having R1 not equal to R2 in the present invention allows the present invention to grip different diameters of tubulars while simultaneously centering with minimal error. Any number of customized variations of tubular diameter ranges can be accommodated by geometrically solving for the optimum size of links 230 and 238 and appropriately sizing the distances R1 and R2 of the jaws 279 and 216 so as to provide the best mechanical advantage for the space available. Sizing the gripper 210 of the present invention in this manner allows the gripper 210 to grip with zero centering error for any two tubular reference diameters and nearly zero error for any tubular diameter between the reference diameters and just less than the smaller reference diameter and just more than the larger reference diameter. The apparatus 10 of the present invention achieves zero centering error for any two tubular diameters. The present invention contemplates that any range of diameters would have a large diameter that is several times the value of the small diameter, and wherein this range of tubular diameters would have exactly zero centering error for at least two specific sizes of pipe. The present invention also is unlimited in the geometry relative to the distances R1 and R2. That is, R1 and R2 can be any values where R1 is not equal to R2.

Another important and novel feature of the present invention is the orientation of the links 230 and 238. First link 230 is pivotally connected to the drive yoke 252 at second pivot point 270. Link 230 angles outwardly to first pivot point 232, where the first link 230 is pivotally connected to the first jaw 279. Likewise, the second link 238 is pivotally connected to the drive yoke 252 at second pivot point 260 and angles outwardly to first pivot point 240, where the second link 238 is pivotally connected to the second jaw 216. The outward angle of links 230 and 238 uses less space than prior art gripping apparatuses that have links extending parallel to the length of the gripper. Thus, the gripper 210 of the present invention can be used in smaller spaces than prior art gripping apparatus. The links 230 and 238 move both laterally and longitudinally, as opposed to only longitudinally.

When it is desired to release the tubular 18, it is only necessary for the piston-and-cylinder assembly of actuator 248 to move rearwardly. This serves to cause the tubular-contacting surfaces 220, 222 and 242 of the first jaw 279, second jaw 216, and drive yoke 252, respectively, to move radially outwardly away from the outer surface of the tubular 18 so as to properly release the tubular 18 in a desired location. Further movement of the piston-and-cylinder assembly 54 of the actuator 248 rearwardly of the gripper 210 will cause the jaws 279 and 216, along with the drive yoke 252, to move the tubular-contacting surfaces 220, 222 and 242 further away from each other so that this opening will allow the introduction of another tubular 18. Through the use of the present invention, a variety of tubular diameters can be utilized without the need to change the gripping gripper 210. The gripper 210 of the present invention automatically grips different diameters of tubular while, at the same time, assuring a proper centering of such tubulars. The size of the links 230 and 238, along with the relationship between the respective pivot points 232, 270, 240, and 260, is engineered so as to assure such simultaneous movement.

Figure 9:
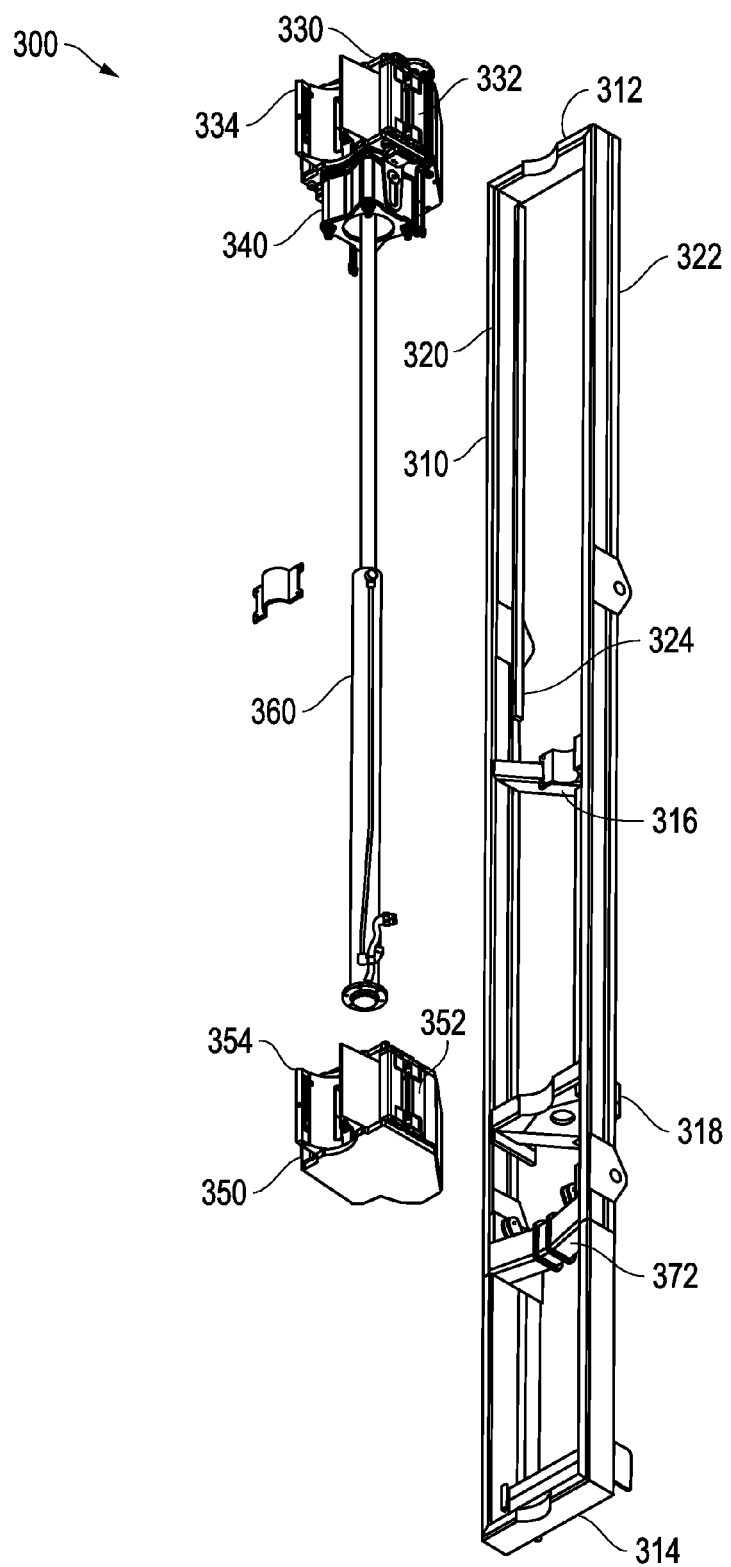
FIG. 9 is an isometric exploded view of an alterative embodiment of the tubular handling apparatus.

FIG. 9 is an isometric exploded view of an alternative embodiment of the tubular handling apparatus, illustrated as a counterbalanced tubular handling apparatus 300. In the view, tubular handling apparatus 300 has a generally rectangular frame 310 comprised of substantially parallel side bars 320 and 322. Side bars 320 and 322 are separated by upper end 312 and lower end 314. An actuator support 316 may be located between side bars 320 and 322 and also between ends 312 and 314. In one embodiment, a translatable rail 324 is located on the inside of each side bar 320 and 322.

A first gripper 330 is provided having jaws 334 for clamping onto a tubular. A guide assembly 332 is provided on each exterior side of first gripper 330 for engaging rails 324 in a translatable relationship, such as by sliding or other means. A load transition spring assembly (LTSA) 340 is provided on the bottom of first gripper 330.

An actuator base 318 is located on stab frame 310, between side bars 320 and 322, and above lower end 314 of stab frame 310. An actuator support 316 is located between side bars 320 and 322, and between actuator base 318 and upper end 312 of stab frame 310. An extendable and retractable actuator 360 is secured to stab frame 310, at actuator base 318 and actuator support 316.

A second gripper 350 is provided having jaws 354 for clamping onto a tubular. In one embodiment, a guide assembly 352 is provided on each exterior side of second gripper 350 for engaging rails 324 to position second gripper 350 on stab frame 310. Second gripper 350 is rigidly attached to a stab frame 310 between side bars 320 and 322, and beneath actuator base 318. Second gripper 350 may be supported on stab frame 310 by a gripper support 372. Gripper support 372 is located below actuator base 318 and between side bars 320 and 322 such that it may support the weight of second gripper 350.

Figure 10:
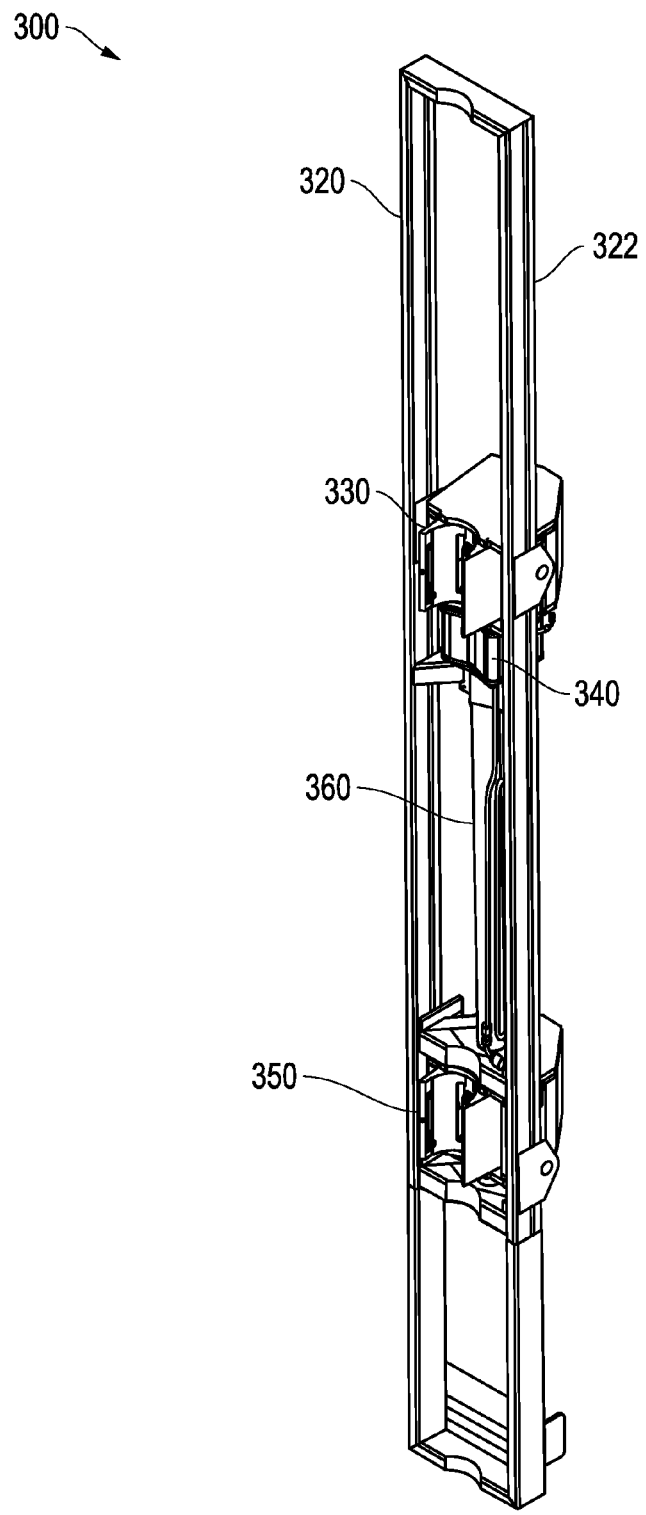
FIG. 10 is an isometric view of the embodiment of the invention of FIG. 9, illustrated with the stabbing gripper in the extended position in the stabbing frame.

FIG. 10 is an isometric view of the embodiment of the invention of FIG. 9, illustrated with tubular handling apparatus 300 assembled, and with first gripper 330 shown in a lowered position, with actuator 360 fully retracted. This is a typical position for attachment to a tubular that is resting vertically on a drill floor.

Figure 11:
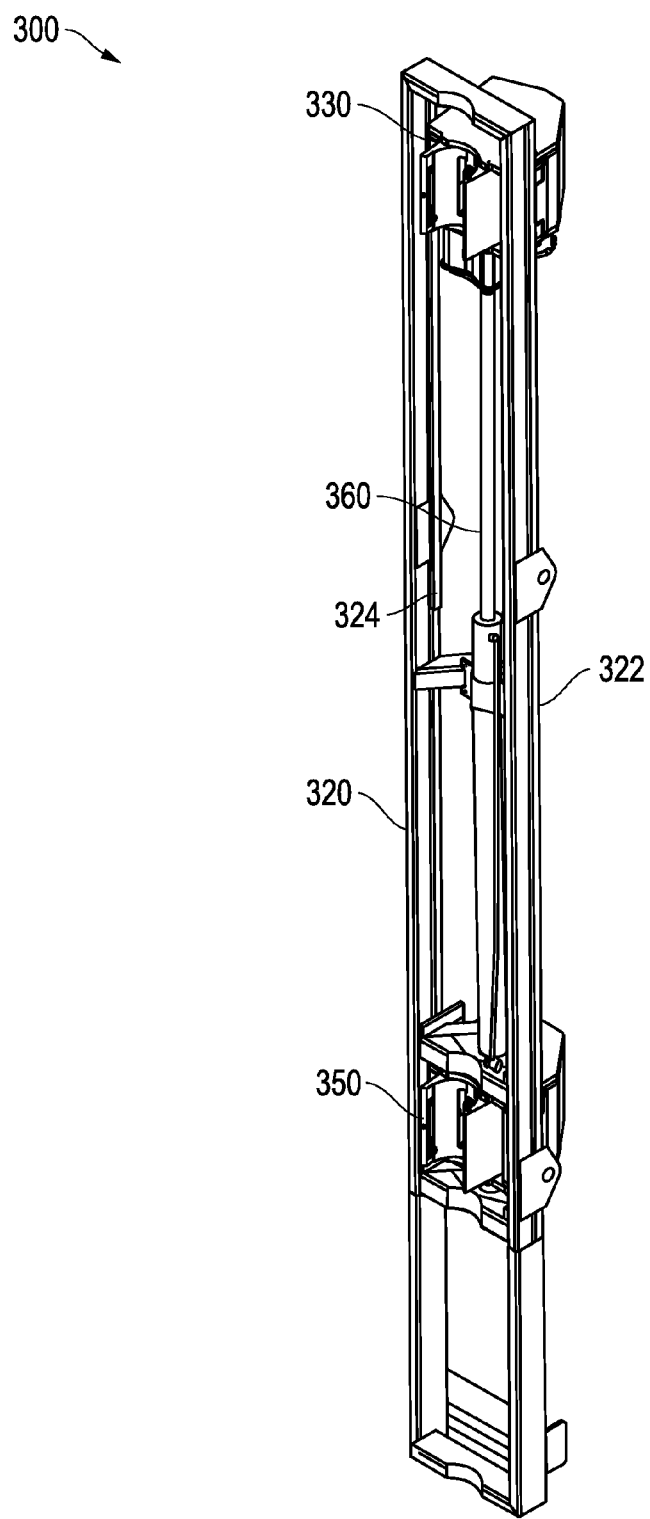
FIG. 11 is an isometric view of the embodiment of the invention of FIGS. 9 and 10, illustrated with the stabbing gripper in the retracted position in the stabbing frame.

FIG. 11 is an isometric view of the embodiment of the invention of FIGS. 9-10 illustrated with tubular handling apparatus 300 assembled, and with first gripper 330 shown in a raised position within stab frame 310, with actuator 360 fully extended. This is a typical position for moving a tubular after picking it up.

Figure 12:
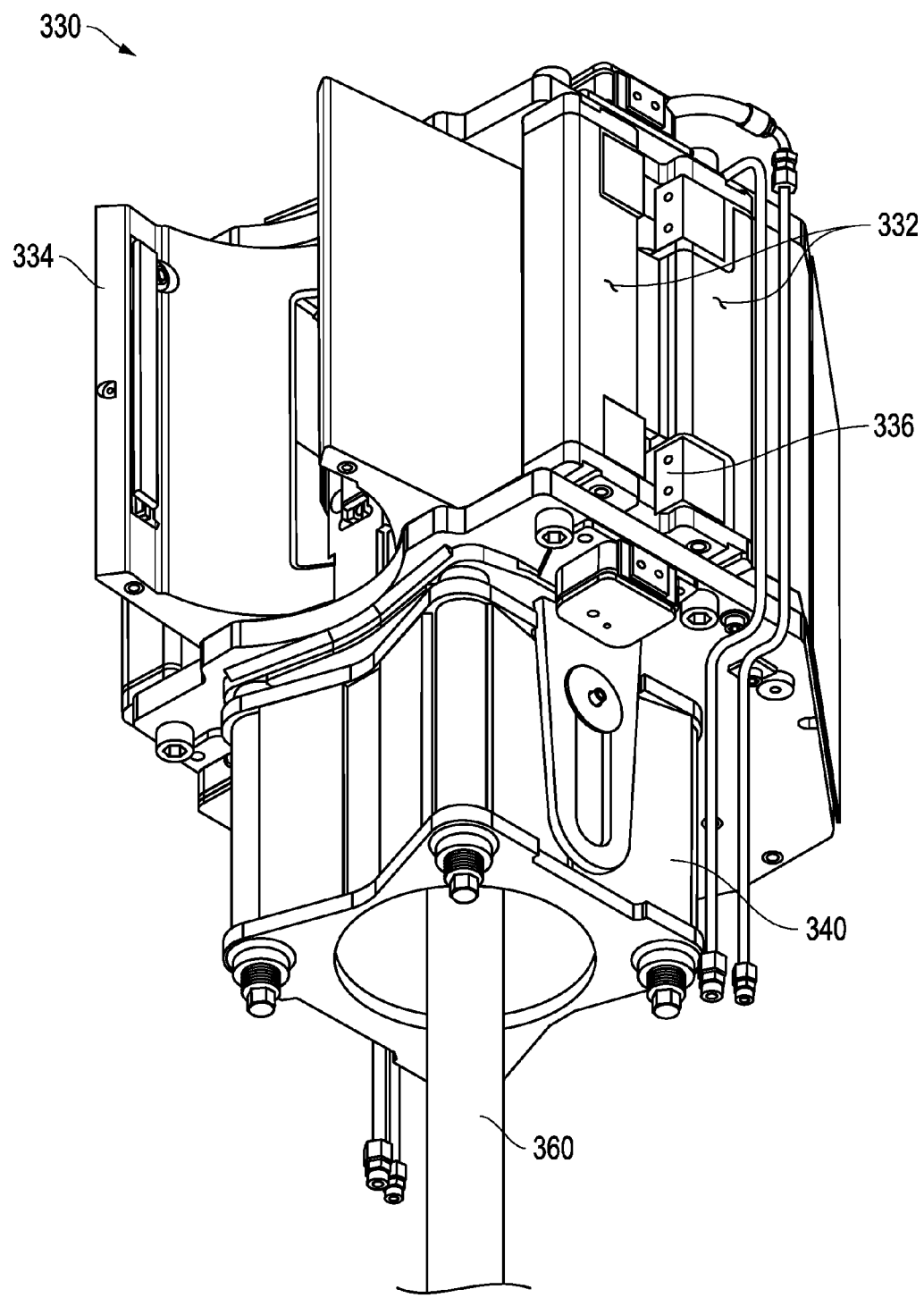
FIG. 12 is a close up view of the embodiment of the invention of FIGS. 9-11, illustrating an embodiment of the guide assembly and load transition spring assembly (LTSA) features of the invention.

FIG. 12 is a close up view of the embodiment of the invention of FIGS. 9-11, illustrating one embodiment of the guide assembly 332 and LTSA 340 features of the invention. Guide assemblies 332 may include replaceable wear components 336 for engaging rails 324 on the interior of side bars 320 and 322. LTSA 340 prevents hyperextension and damage to actuator 360 when first gripper 330 and second gripper 350 are gripping a tubular, and the tubular engages another structure or other tubular. LTSA 340 further acts to prevent transfer of impact forces between the tubular and actuator 360 and the remainder of tubular handling system 300.

In the novel configuration illustrated, first gripper 330 and second gripper 350 are located between side bars 320 and 322. First gripper 330 is vertically translatable relative to stab frame 310, whereas second gripper 350 is stationary therein.

The foregoing disclosure and description of the invention is illustrative and explanatory thereof. Various changes in the details of the illustrated construction can be made without departing from the true spirit of the invention. The present invention should only be limited by the following claims and their legal equivalents.

The invention claimed is:

1. A tubular handling apparatus comprising:
   a structural member movable between a first position and a second position;
   an opening in the structural member;
   an arm interconnected to the structural member so as to be movable in relation to the structural member;
   a frame comprising:
   a pair of opposing side bars;
   an upper end located between the side bars; and,
   a lower end located between the side bars;
   the frame having a first side affixed to the arm, and having an opposite second side;
   a first and second gripper connected to the frame and extending outwardly from the second side, the first and second grippers being operable to grip a surface of a tubular;
   an actuator mounted between the first and second gripper, the actuator operable to translate the first gripper along the frame relative to the second gripper; and,
   the frame being movable through the opening in the structural member as the structural member moves between the first and second positions.

2. The tubular handling apparatus of claim 1, the frame further comprising:
   a translatable rail located on each side bar.

3. The tubular handling apparatus of claim 2, further comprising:
   a guide assembly on an exterior side of the first gripper engagable with the translatable rail in a translatable relationship.

4. The tubular handling apparatus of claim 2, further comprising:
   an actuator support attached between the side bars;
   the support located between the actuator base and the first gripper;
   the support connected to the actuator; and,
   the support stabilizing the actuator between the side bars while permitting extension and retraction of the actuator.

5. The tubular handling apparatus of claim 1, the frame further comprising:
   an actuator base located between the sidebars;
   the actuator base located between an upper end of the frame and the second gripper;
   a lower end of the actuator mounted to the actuator base;
   an upper end of the actuator connected to the first gripper; and,
   operation of the actuator moving the first gripper along the frame in relation to the position of the second gripper.

6. The tubular handling apparatus of claim 5, further comprising:
   a load transition spring assembly connected between the actuator and first gripper.

7. The tubular handling apparatus of claim 5, further comprising:
   the guide assembly having a replaceable wear component; and,
   the wear component engaging the rail.

* * * * *